(12) United States Patent
Steinmann et al.

(10) Patent No.: US 7,313,569 B2
(45) Date of Patent: Dec. 25, 2007

(54) MAPPING DATA SETS TO A TARGET STRUCTURE

(75) Inventors: Joerg Steinmann, Voelkling (DE);
Karthikeyan Ayyadural, Bangalore (IN); Himanshu Kacker, Bangalore (IN); Mohan Marar, Bangalore (IN); Jayanta M. Boruah, Bangalore (IN); Wolfgang Gentes, Zweibruecken (DE)

(73) Assignee: SAP AG, Walldorf (DE)

( * ) Notice: Subject to any disclaimer, the term of this patent is extended or adjusted under 35 U.S.C. 154(b) by 607 days.

(21) Appl. No.: 10/831,974

(22) Filed: Apr. 26, 2004

(65) Prior Publication Data

US 2005/0237268 A1 Oct. 27, 2005

(51) Int. Cl.
*G06F 17/30* (2006.01)
*G06F 15/16* (2006.01)

(52) U.S. Cl. ............... 707/102; 707/100; 707/101; 715/500

(58) Field of Classification Search ........... 707/100, 707/101, 102; 715/500
See application file for complete search history.

(56) References Cited

U.S. PATENT DOCUMENTS

| | | | |
|---|---|---|---|
| 5,689,699 A | | 11/1997 | Howell et al. |
| 6,128,617 A | * | 10/2000 | Lowry ................. 707/100 |
| 2002/0046248 A1 | | 4/2002 | Drexler |
| 2002/0056075 A1 | * | 5/2002 | Hamilton et al. ........... 717/110 |
| 2002/0184609 A1 | * | 12/2002 | Sells et al. .................. 717/106 |
| 2002/0194196 A1 | * | 12/2002 | Weinberg et al. ......... 707/104.1 |
| 2003/0004945 A1 | | 1/2003 | Teng et al. |

FOREIGN PATENT DOCUMENTS

| | | |
|---|---|---|
| EP | 0458179 | 11/1991 |
| EP | 1217540 | 6/2002 |
| WO | 03/012611 | 2/2003 |

OTHER PUBLICATIONS

Chaudhuri, Surajit, et al., "An Overview of Data Warehousing and OLAP Technology," *SIGMOD Record*, SIGMOD, New York, USA, vol. 26, No. 1, Mar. 1997, pp. 65-74, XP002193792.
Squire, Cass, "Data Extraction and Transformation for the Data Warehouse," *ACM Proceedings of SIGMOD, International Conference on Management of Data*, vol. 24, No. 1, Mar. 1, 1995, pp. 446-447, XP002091745.
White, Colin, "Data Warehousing: Cleaning and Transforming Data," INFO DB, Iowa City, USA, vol. 10, No. 6, Apr. 6, 1997, pp. 11-12, XP002091743.
White, Colin, "Managing Data Transformations," *Byte*, McGraw-Hill Inc., St. Petersborough, USA, Dec. 1, 1997, pp. 53-54, XP000728707.

* cited by examiner

*Primary Examiner*—John Breene
*Assistant Examiner*—Alex Gofman
(74) *Attorney, Agent, or Firm*—Fish & Richardson P.C.

(57) ABSTRACT

According to the present invention there is provided a user interface for mapping data sets to a target data structure. Each data set comprises data segments separated by a separator. The target data structure comprises target data fields. The user interface comprises: 1) a segment display section in which data segments of one data set are displayed; 2) a target display section in which possible target fields to which data segments can be associated/mapped are displayed; 3) a selection device for associating a predetermined data segment with a target field; and 4) a contents preview display section in which the different values contained in one selected data segment of all data sets is displayed. Furthermore, there is provided a method and computer system.

11 Claims, 18 Drawing Sheets

*Display Address List: PERSON_LIST*

Search / Favorites

Find
By
ID
Description

Address List
Description: PERSON_LIST — List with persons

Basic Data / Process Steps / Text / Data after Mapping / Details — 40

Start Position: 1

| Record No | Title | First Name | Last Na... | Second Forename or Middle Name | Date of Birth | Gender | Postal Code |
|---|---|---|---|---|---|---|---|
| 1 | 0002 | James | Edwards | T. | | | 12345 |
| 2 | 0002 | Leonard | McNeel | H. | | | 77777 |
| 3 | 0002 | Homer | Wilsom | J. | | | 98765 |
| 4 | 0002 | Hugh | Deep | | | | 98765 |
| 5 | 0002 | Bartholomew | Ozz | | | | 66763 |
| 6 | 0002 | Bernd | Gelb | | | | 66763 |
| 7 | 0002 | Franz | Franz | | | | 66763 |
| 8 | 0002 | Josef | Schwarz | | | | 66763 |
| 9 | 0002 | Winfried | Rot | | | | 66763 |
| 10 | 0002 | Johannes | Gelb | | | | 66763 |

MAPPING DATA SETS TO A TARGET STRUCTURE

TECHNICAL FIELD

The present invention relates to a graphical user interface for mapping data sets to a target structure.

BACKGROUND

User interfaces for mapping data sets to a target structure are known. However, prior art user interfaces have the drawback that the user needs an in depth knowledge of the mapping process to be able to operate the respective mapping tools.

SUMMARY

It is therefore an object of the present invention to provide a graphical user interface for mapping data sets to a target structure being convenient to use for the user. This object is solved according to the present invention by a graphical user interface having the features disclosed in claim 1. Preferred embodiments are subject of the dependent claims.

According to the present invention there is provided a graphical user interface for mapping data sets to a target data structure. Each data set comprising data segments separated by a separator. The target data structure comprising target data fields. The graphical user interface comprises 1) a segment display section in which data segments of one data set are displayed; 2) a target display section in which possible target fields to which data segments can be associated/mapped are displayed; 3) a selection device for associating a predetermined data segment with a target field; and 4) a contents preview display section in which the different values contained in one selected data segment of all data sets is displayed.

By providing said contents preview display section the user can easily view substantially all different values contained in one particular data segment of all data set to be imported/mapped.

Various implementations may have one or more of the following. The data segments preferably each contain different values of different categories. The separator is preferably a comma, semicolon, tab, or any other suitable character or sign. Preferably the graphical user interface comprises a value mapping section. In the value mapping section a specified (predetermined or predeterminable) value of a data segment can be associated with a specified target value.

The graphical user interface preferably comprises a constant association display section in which a constant value to be associated with a particular data segment of substantially all data sets can be selected and/or input. Thus additional properties of a data set not yet contained in the data set can be introduced.

The graphical user interface can furthermore comprise a code input section in which program code can be input for processing the contents of data segments to be associated with target fields. Thus, a complex conversion of data segments to target fields can be provided.

Moreover a global definition input section for inputting global variables used during execution of said input program code can be provided. Preferably the graphical user interface comprises a separator input field for inputting the type of separator used and/or a file name input field for inputting the filename of a file in which said data sets are stored. The segment display section furthermore preferably comprises fields for displaying target fields associated with data segments, respectively.

According to the invention there is furthermore provided a method for displaying a graphical user interface for mapping data sets to a target data structure. Each data set comprising data segments separated by a separator. The target data structure comprising target data fields, said method comprising the steps of: 1) displaying a segment display section in which data segments of one data set are displayed; 2) displaying a target display section in which possible target fields to which data segments can be associated/mapped are displayed; 3) displaying a selection device for associating a predetermined data segment with a target field; and 4) displaying a contents preview display section in which the different values contained in one selected data segment of all data sets is displayed.

Moreover, there is provided a computer system for mapping data sets to a target data structure comprising a graphical user interface according to the invention or one of the preferred embodiments thereof.

Further features and advantages will become apparent from the following detailed description of preferred embodiments of the present invention with reference to the drawings.

DESCRIPTION OF DRAWINGS

FIGS. 3A-3H show screen-shots of a graphical user interface for operating the table structure.

Like reference symbols in the various drawings indicate like elements.

DETAILED DESCRIPTION

Figure 1:
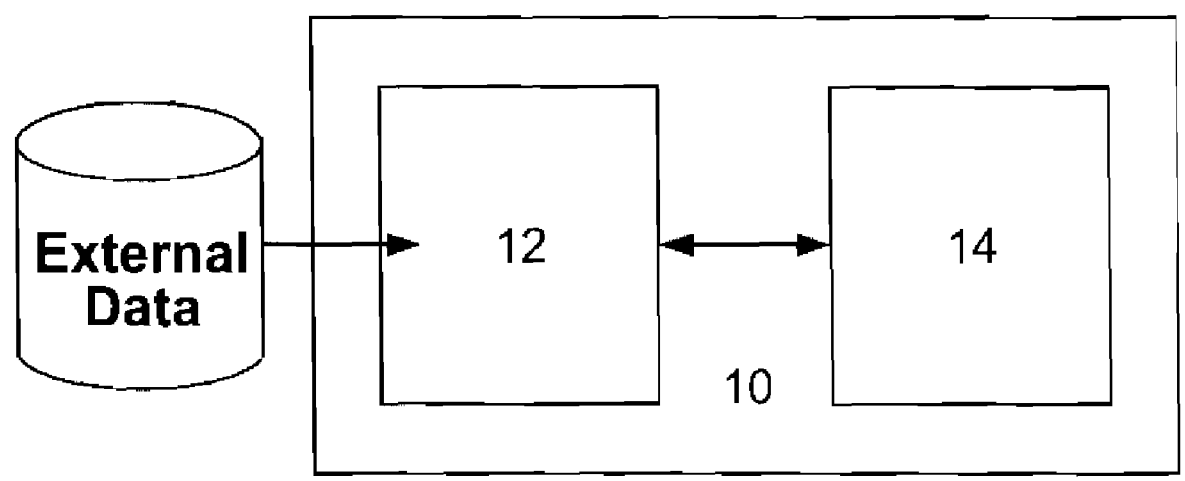
FIG. 1 schematically shows a system for importing an processing data.

A user system 10 for importing and processing data is schematically shown in FIG. 1. The user system 10 comprises a first section 12 which can be used for importing and processing external data. The user system furthermore comprises at least one second section 14 in which data contained in the user system is processed.

A table structure and method for importing and processing large amounts of data sets into said user system 10 will be described in the following. As a preferred embodiment, the importing and processing of address data in a system will be described hereinafter.

External data comprising a plurality of data sets to be imported into a system are provided on an electronic storage medium, like a CD, or are received via ISDN, email, and so on. The data sets are provided in a predefined format in a data file e.g. ASCII, Excel, or dBase. The data sets comprise data segments of different categories. For address data such categories could be first name, last name, street, house number, city, etc. The segments of a data set are separated by a separator in the data file. The separator can be e.g. comma, semicolon, tab or any other character.

Figure 2:
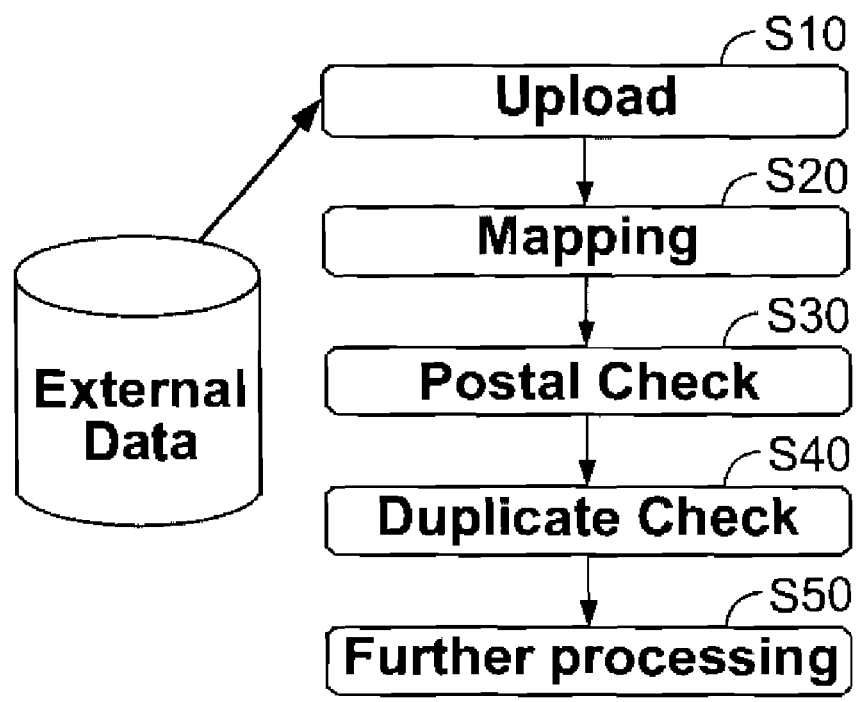
FIG. 2 shows a schematic overview of a method of uploading and processing data in a preferred table structure.

FIG. 2 shows a schematic overview of a method of uploading and processing data in a preferred table structure.

External data to be imported into the system are first uploaded without any further processing (step S10). The data sets uploaded in the user system are referred to as "data list". The uploaded data sets are mapped (step S20). In particular the data structure of the uploaded data sets is transferred to the data structure of the system (to be described later). After mapping the data sets several checks are performed on the data sets in order to verify if particular properties of the data sets are correct. In the present case, as address data sets are used, a postal check (step S30) and a duplicate check (step S40) are performed. In the postal check it is verified whether the address data provided is correct with respect to general properties, e.g. it is checked whether the postal code correctly corresponds to the city given in one data set.

During the duplicate check step, it is checked whether duplicate data sets, i.e. substantially identical data sets or data sets having a specified (predetermined or predeterminable) range of identical data fields are present. During this check it can be verified whether a newly imported data set is substantially identical to a data set already present in the system or whether two newly imported data sets are identical. The duplicate check can e.g. be performed by comparing the components of the one data set (last name, first name, street, . . . ) with the same components of another data set.

After having performed the various checks, the imported data sets can be further processed (step S50) as will be described later.

In the following, a table structure used for importing and processing data and/or data sets will hereinafter be referred to as a "staging area".

The staging area comprises a plurality of tables into which data segments of the imported data sets and/or additional information relating to the data list is written.

The external data stored on a data storage medium is read line by line (data set by data set) and stored in table CRMD_MKTLIST_C. During this step, the data is not processed in any way. This means that in CRMD_MK-TLIST_C the data is stored in a form similar to the form of the provided data in the data file. The data segments separated by the separator are written into the table CRMD_MK-TLIST_C substantially without an processing. Thus the data sets as a whole are transferred from the data storage medium to the table CRMD_MKTLIST_C without being split up into separate parts.

The data stored in CRMD_MKTLIST_C is then mapped. During the mapping step the data sets stored in CRMD_MKTLIST_C are each divided up, whereby one or more segments of each data set are stored e.g. in either of tables CRMD_MKTLIST_ADR, CRMD_MKTLIST_ORG, CRMD_MKTLIST_PER, CRMD_MKTLIST_CEN. In CRMD_MKTLIST_ADR data segments of each data set relating to address properties (e.g. street, postal code, city, . . . ) of the data sets are stored. In CRMD_MKTLIST_ORG data segments of each data set relating to the data set's organizational properties (e.g. company name, . . . ) are stored. In CRMD_MKTLIST_PER data segments of each data set relating to the person (e.g. first name, last name, age, sex, . . . ) are stored. In CRMD_MKTLIST_CEN data segments of each data set relating to containing additional information (e.g. contact person of a company, . . . ) are stored.

If the data sets relate to other types of data, other suitable tables can be used.

A table CRMD_MKTLIST_E is provided in which error messages for errors which occur during the processing of the data are logged.

Furthermore, there is provided a plurality of tables which form a so called "administrative area". In the present system the following tables are provided:

CRMD_MKTLIST_H
CRMD_MKTLIST_T
CRMD_MKTLIST_PH
CRMD_MKTLIST_S
CRMD_MKTLIST_L
CRMD_MKTLIST_I

In CRMD_MKTLIST_H header information and attributes (e.g. origin of the data, type of the data, costs) relating to the list are stored. In CRMD_MKTLIST_T additional information (e.g. short description, language dependent) relating to the list is stored. In CRMD_MKTLIST_PH package header information and attributes is stored, e.g. the mapping format used or the name of the provided file containing the data sets to be imported. In CRMD_MKTLIST_S the steps which have already been processed for a specific data list are indicated. In CRMD_MKTLIST_L builds the connection between the header and the list itself. In particular a reference to CRMD_MKTLIST_H is stored in this table. In CRMD_MKTLIST_I a link or reference to a created data object (to be described later) is stored for each data set.

In the following, examples of the above mentioned tables are shown:

| Header table CRMD_MKTLIST_H | | |
|---|---|---|
| Field | Data type/-element | Meaning |
| CLIENT | MANDT | Client |
| LIST_GUID | RAW16 | GUID of the list |
| LIST_ID | CHAR28 | ID of the list |
| LIST_ID_LOGSYS | CHAR10 | Logical system where the list was created |
| ORIGIN | CHAR6 | Origin of the list |
| TYPE | CHAR2 | Type of the list (bought, rented) |
| VALID_DATE_TO | DATS8 | Recommended End-of-Use Date |
| MAX_USAGE_NO | NUMC4 | Permitted No. of Uses for Address List |
| MAX_USAGE_DATE | DATS8 | Permitted End-of-Use Date |
| NO_GROSS | NUMC8 | Gross number |
| COSTS | CURR15 | Costs |
| COSTS_CURRENCY | CUKY5 | Currency of costs |
| CREATED_AT | DEC15 | Creation date |
| CREATED_BY | CHAR12 | Creation user |
| CHANGED_AT | DEC15 | Change date |
| CHANGED_BY | CHAR12 | Change user |
| DELETED | CHAR1 | Flag which indicates that list is deleted |
| APPL_LOG_ID | CHAR22 | ID of application log of deletion |

Item table CRMD_MKTLIST_I

| Field | Data type/-element | Meaning |
|---|---|---|
| CLIENT | MANDT | Client |
| ITEM_GUID | RAW16 | GUID of the line |
| LIST_GUID | RAW16 | GUID of the list |
| BP_GUID_ORG | RAW16 | GUID of the assigned business partner (type organization) |
| BP_GUID_PER | RAW16 | GUID of the assigned business partner (type person) |
| POSTAL | CHAR1 | Flag that the entry has postal errors |
| DUPLICATE | CHAR1 | Flag that the entry is a duplicate |

Text table CRMD_MKTLIST_T

| Field | Data type/-element | Meaning |
|---|---|---|
| CLIENT | MANDT | Client |
| LIST_GUID | RAW16 | GUID of the list |
| LIST_LG | LANG1 | Language |
| LIST_DESCR | CHAR60 | Description |

Header table CRMD_MKTLIST_PH

| Field | Data type/-element | Meaning |
|---|---|---|
| CLIENT | MANDT | Client |
| PACKAGE_GUID | RAW16 | GUID of the package |
| SET_GUID | RAW16 | GUID of the profile set |
| SET_DESCRIPTION | CHAR72 | description of a profile set |
| EXISTING_SET | CHAR1 | |
| PF_GUID | RAW16 | GUID of a profile |
| TG_GUID | RAW16 | GUID of the target group |
| TG_DESCRIPTION | CHAR72 | description of a target group |
| MAPPING_FORMAT | CHAR6 | format of an external list |
| SEPARATOR_TYPE | CHAR1 | Field separator type |
| SEPARATOR_CHAR | CHAR1 | Field separator character |
| FILE | CHAR255 | Location of the file |
| FILE_STORAGE | CHAR1 | Storage place of file: workstation or server |

Package-List-Assignment table CRMD_MKTLIST_L

| Field | Data type/-element | Meaning |
|---|---|---|
| CLIENT | MANDT | Client |
| PACKAGE_GUID | RAW16 | GUID of the package |
| LIST_GUID | RAW16 | GUID of the list |

Package-Workflow-Steps-Assignment table CRMD_MKTLIST_S

| Field | Data type/-element | Meaning |
|---|---|---|
| CLIENT | MANDT | Client |
| PACKAGE_GUID | RAW16 | GUID of the package |
| STEP | CHAR1 | Step (U, M, P, D, B, T, C, R) |
| FLAG | CHAR1 | flag, which indicates that step is selected |
| STATUS | CHAR1 | defines, what the process status of the step is (active, finished or error) |
| ATTR_ERROR | CHAR1 | Determines, what the workflow has to do, if the step has an error (break or continue) |
| REPEAT_ALL | CHAR1 | Determines: wants the user to repeat the step for all entries in the list or only for the failed, if in the step occurs an error |
| APPL_LOG_ID | CHAR22 | Application Log: Handle of a protocol |

A graphical user interface for operating the staging area will be described with reference to FIGS. 3A to 3H.

The graphical user interface comprises a field 30 for inputting an ID of a list to be created and a field 32 for inputting a description of the list. Furthermore, the graphical user interface comprises a plurality of tab strips 34-42 for selecting specified input screens described hereinafter.

Figure 3A:
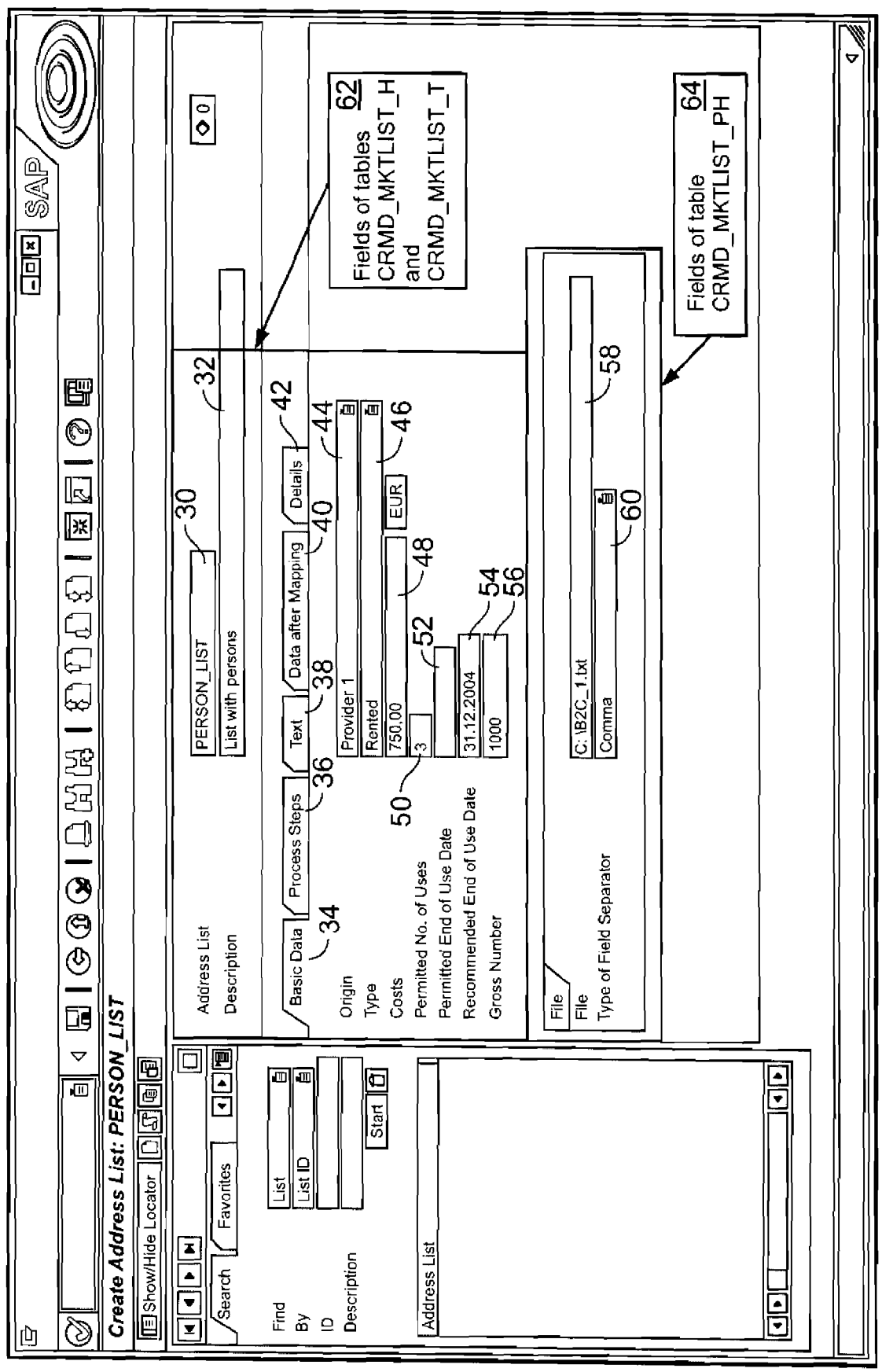

FIG. 3A shows a basic screen for inputting basic data relating to the data file to be uploaded.

If the user wants to upload a new data file he must create a new data list. The user enters an ID of the data list in field 30 (in the present case: PERSON_LIST) and a description of the list in field 32. On tab strip 32 the user enters or can enter attributes such as the origin in field 44, the type in field 46, the costs in field 48, the permitted number of uses in field 50 or permitted end of use date in field 52 (if the data sets can only be used for a specified (predetermined or predeterminable) number of times and/or a specified (predetermined or predeterminable) usage period, to be described later), recommended end of use date in field 54 and/or the gross number in field 56 (=number of expected data sets in the file). This information input in region 62 is stored in tables CRMD_MKTLIST_H and CRMD_MKTLIST_T.

Furthermore, the user enters the file name (with complete path) in field 58 and the field separator used in the data file to be imported (comma, semicolon, tab, other character) in field 60. A so called "package" is created and the information input in region 64 is stored in table CRMD_MKTLIST_PH.

Figure 3B:
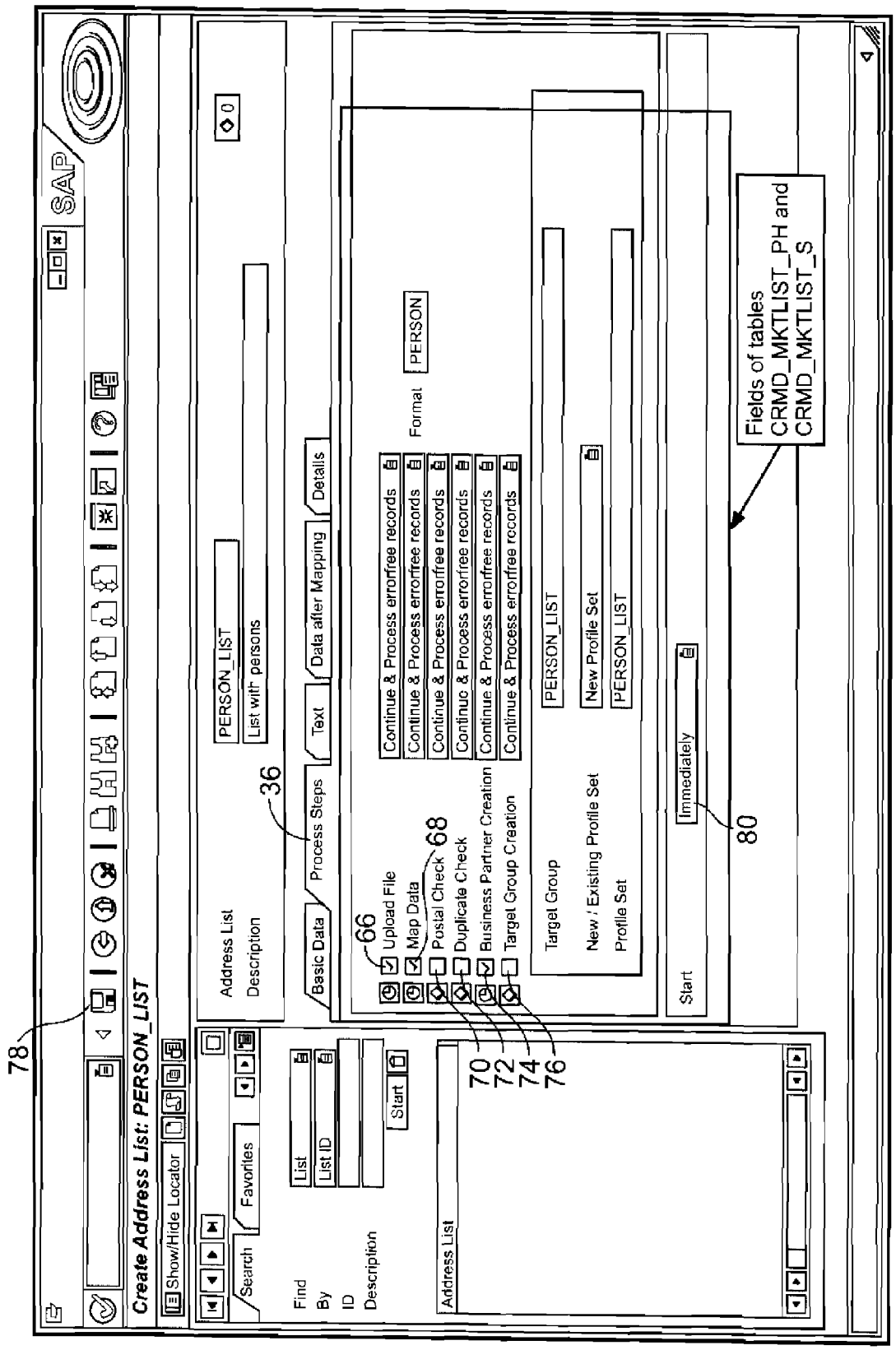

FIG. 3B shows a screen for inputting information relating to process steps to be performed.

On tab strip 36 the user can mark in the fields 68-74 the steps or processing that should be processed within one background job, i.e. in one run. In the shown screen, the user can select one, several or all of 'Upload File' (field 66), 'Map Data' (field 68), 'Postal Check' (field 70), 'Duplicate Check' (field 72), and two steps for further processing (fields 74, 76) ('Business Partner Creation' and 'Target Group Creation').

If the step 'Map Data' (field 66) is marked a mapping format must be given (to be described later).

The user can specify in field 80 the start type, i.e. whether the processing is to start immediately or at a specified later time.

If the user presses the save button 78, the entered data is saved.

The input data is then written into tables CRMD_MKTLIST_PH and CRMD_MKTLIST_L by the system. Table CRMD_MKTLIST_S contains all steps for the package, wherein the status of every step is initial.

Figure 3C:
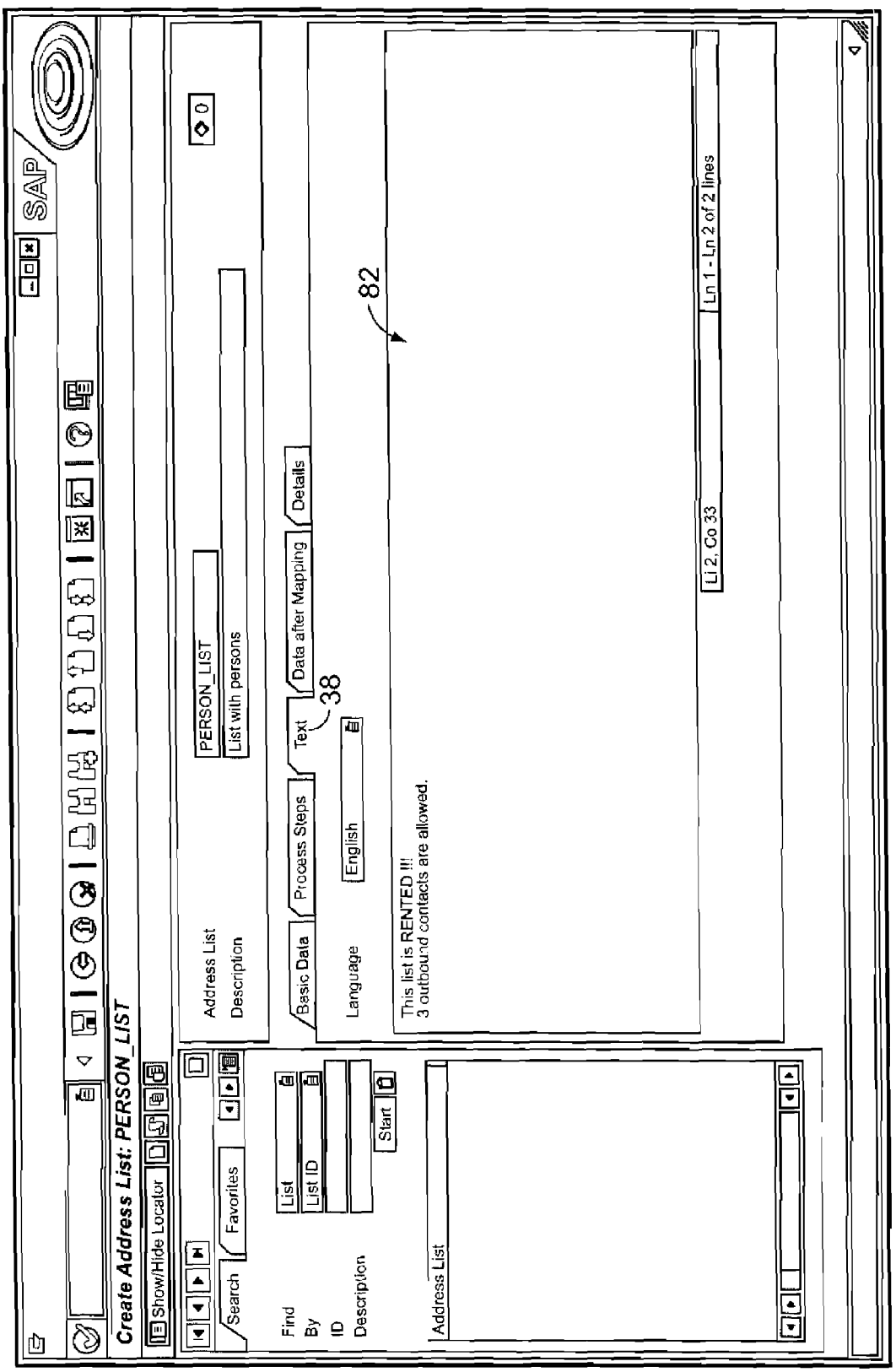

FIG. 3C shows a screen for inputting additional information relating to the list to be imported. On tab strip 38 there is provided a field 82 into which the user can enter a long text.

In the following several examples for processing are given.

The user marks the upload step (field 66), gives a start date/time (field 80) and saves the list (button 78). The file is read from application server and its content is stored in table CRMD_MKTLIST_C. in particular the data sets stored in the data file are read data set by data set and written into table CRMD_MKTLIST_C.

In table CRMD_MKTLIST_S the status of step U ('upload') is updated. If errors occur the step can be repeated. In that case only those data sets of the file are processed which were not transferred to CRMD_MKTLIST_C earlier. If the step was processed without any error it cannot be repeated again.

The user marks the mapping step (field 68), gives a start date/time (field 80) and saves the list (button 78). Once the input by the user is terminated and/or the start time is reached, the processing starts. The previously uploaded data is read from table CRMD_MKTLIST_C data set by data set, mapped and stored in the other tables of the staging area:

CRMD_MKTLIST_ORG
CRMD_MKTLIST_PER
CRMD_MKTLIST_ADR
CRMD_MKTLIST_CEN

In particular, an iterative processing takes place in which respective data segments of each data set are read and subsequently written into one of the above tables.

In table CRMD_MKTLIST_S the status of step M ('mapping') is updated. In table CRMD_MKTLIST_I the items are inserted. If errors occur the step can be repeated for all data sets or only for the erroneous. At start of the repetition for all data sets the entries in CRMD_MKTLIST_E, CRMD_MKTLIST_ADR, CRMD_MKTLIST_ORG, CRMD_MKTLIST_PER and CRMD_MKTLIST_CEN are deleted for the repeated data sets. New entries in CRMD_MKTLIST_E, CRMD_MKTLIST_ADR, CRMD_MKTLIST_ORG, CRMD_MKTLIST_PER and CRMD_MKTLIST_CEN are created during the processing. The entries in CRMD_MKTLIST_I are updated only.

In case of repetition for erroneous data sets, only those data sets that are marked as erroneous (in table CRMD_MKTLIST_E) and those data sets that were not processed in previous execution are processed again. Entries in CRMD_MKTLIST_E are deleted just before creating new entries.

The user marks the step for postal check (field 68), gives a start date/time (field 80) and saves the list (button 78). Once the input by the user is terminated and/or the start time is reached, the processing starts. The previously mapped data is read from tables of the staging area

CRMD_MKTLIST_ORG
CRMD_MKTLIST_PER
CRMD_MKTLIST_ADR
CRMD_MKTLIST_CEN and checked against postal reference data. In table CRMD_MKTLIST_S the status of step P ('Postal Check') is updated. In table CRMD_MKTLIST_I the items are updated, field POSTAL is filled. This step is optional for the processing of the data.

If errors occur the step can be repeated for all data sets s or only for the erroneous. At start of the repetition the entries in CRMD_MKTLIST_E are deleted for the repeated data sets. New entries in CRMD_MKTLIST_E are created during the processing. The entries in CRMD_MKTLIST_I are updated only.

The user marks the step for duplicate check (field 72), gives a start date/time (field 80) and saves the list (button 78). Once the input by the user is terminated and/or the start time is reached, the processing starts. The previously mapped data is read from tables of the staging area

CRMD_MKTLIST_ORG
CRMD_MKTLIST_PER
CRMD_MKTLIST_ADR
CRMD_MKTLIST_CEN and checked if data sets of the lists exist already as business partner in the system. In table CRMD_MKTLIST_S the status of step D ('Duplicate Check') is updated. In table CRMD_MKTLIST_I the items are updated, field DUPLICATE is filled. This step is optional for the processing of the data.

If errors occur the step can be repeated for all data sets or only for the erroneous. At start of the repetition the entries in CRMD_MKTLIST_E are deleted for the repeated data sets. New entries in CRMD_MKTLIST_E are created during the processing. The entries in CRMD_MKTLIST_I are updated only.

Figure 3D:
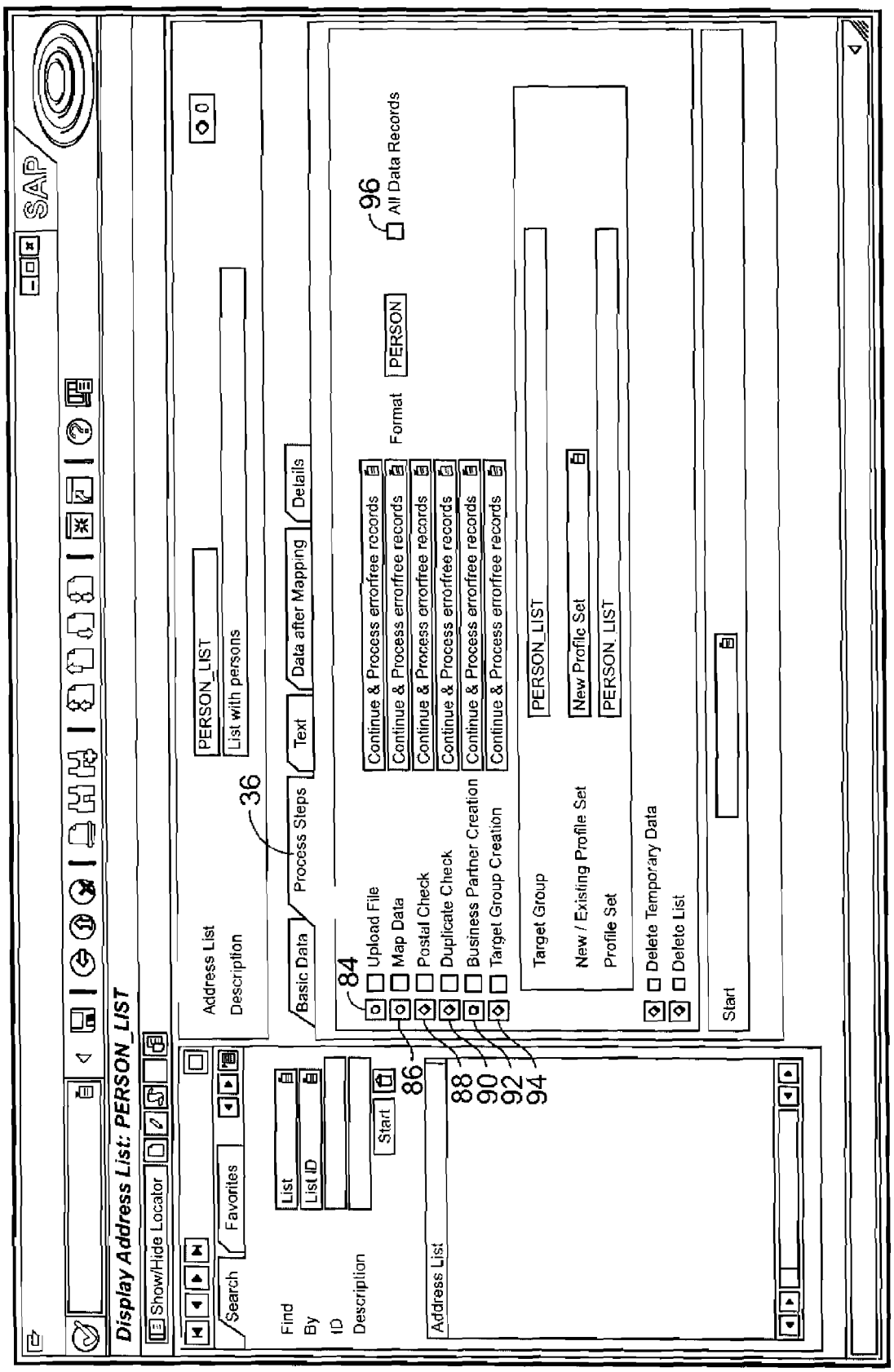

FIG. 3D shows a corresponding to the screen shown in FIG. 3B after the processing of the data has taken place in which tab strip 36 is visible.

After the marked steps are processed a traffic light 84-92 shows if errors occurred. By pressing the button associated with the traffic light 84-92 a popup window with detailed messages appears (see e.g. FIG. 3F).

The processing of the steps can be repeated, the user must mark the step again. For some steps the user can mark a second flag 94. If this flag 94 is marked all data sets are processed again, otherwise only the erroneous data sets are processed again.

Figure 3E:
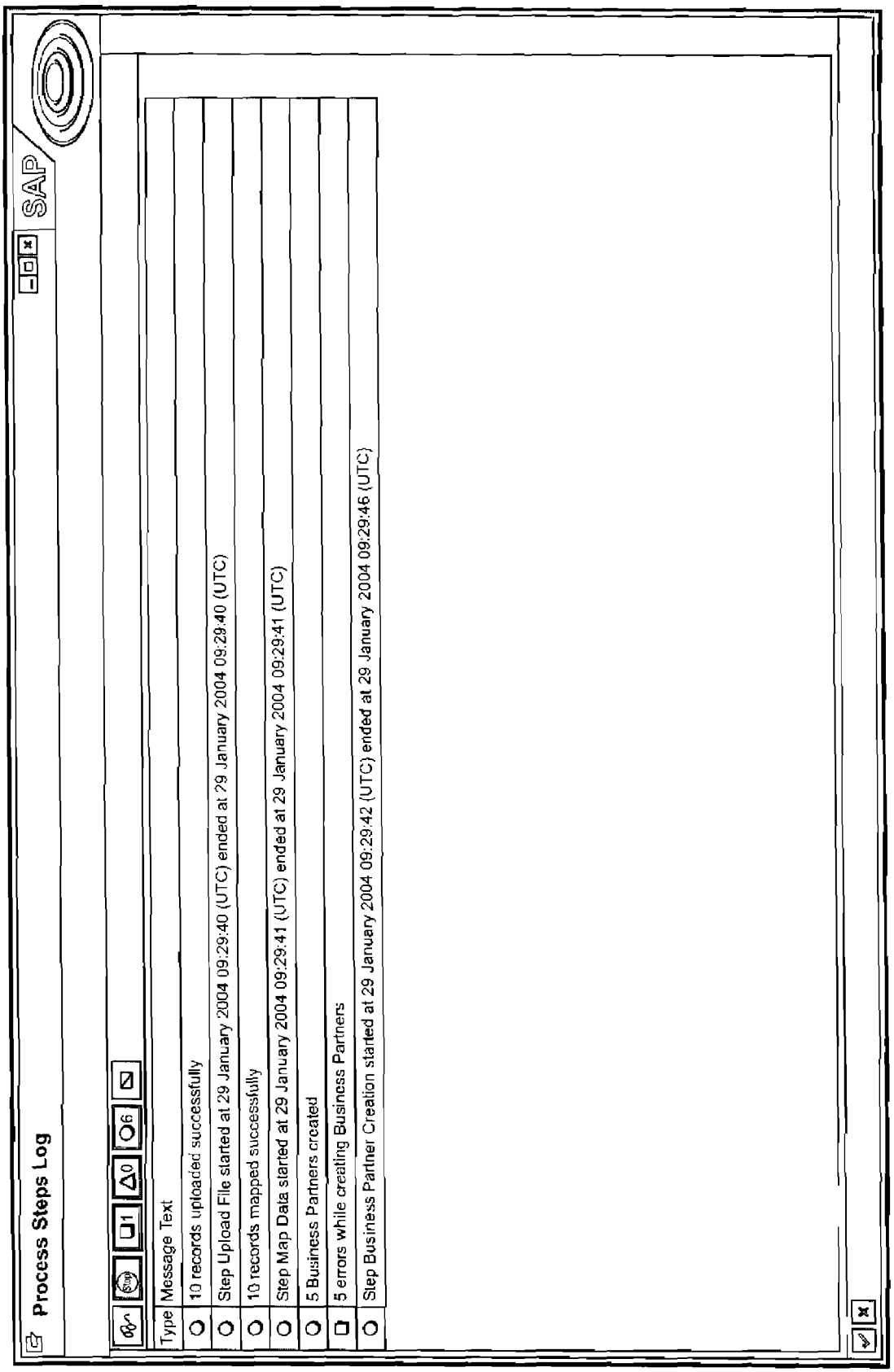

A summary log with status information of all processed steps can be opened by pressing the log button 96 (see FIGS. 3A and 3E).

Figure 3F:
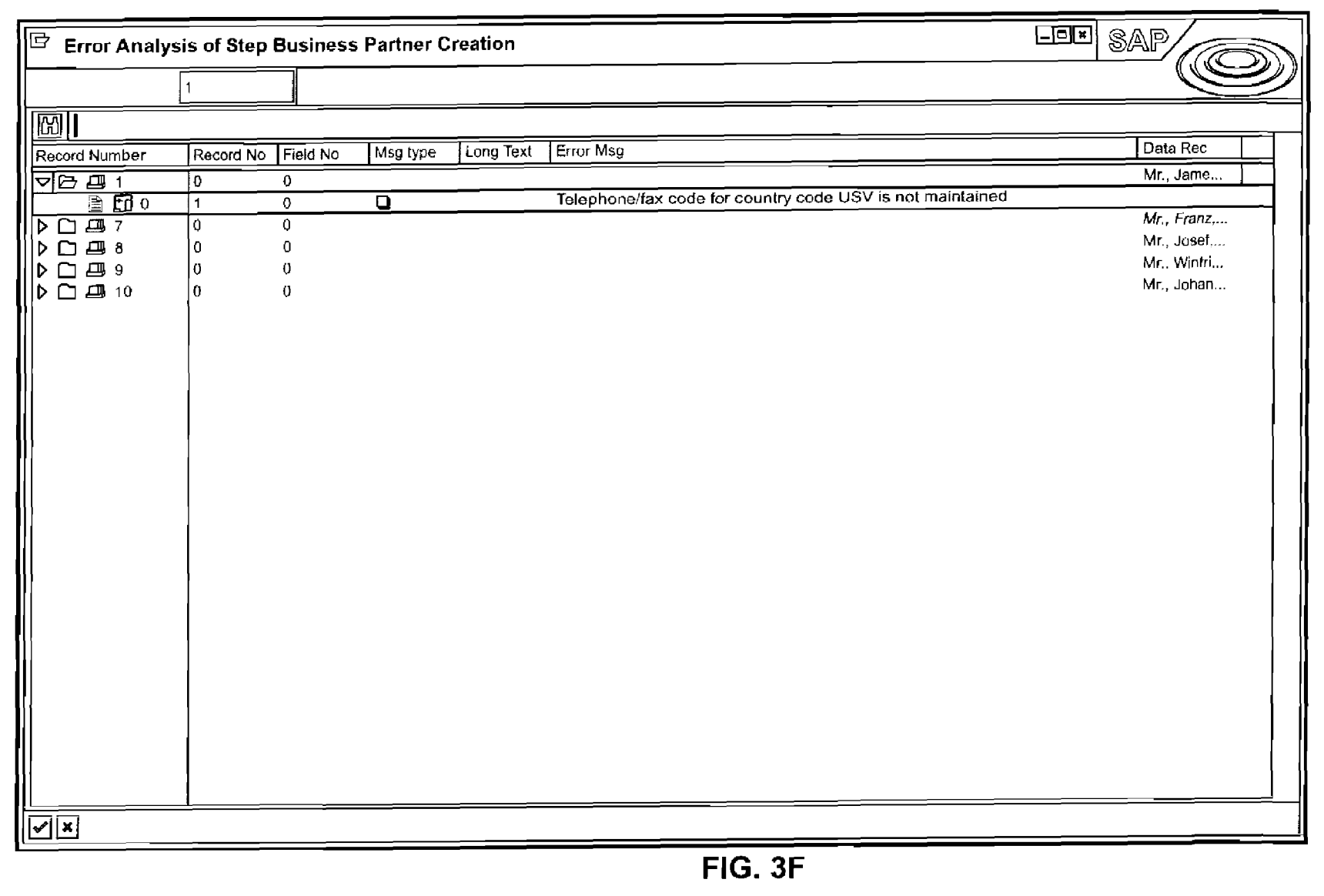

FIG. 3E shows a summary log about status information of all processed steps and FIG. 3F shows a popup with detailed error information of a selected step.

FIG. 3G shows a screen with the tab strip 40. After the step 'Map Data' (to be described later in detail) is processed the result can be checked on this tab strip 40.

Figure 3H:
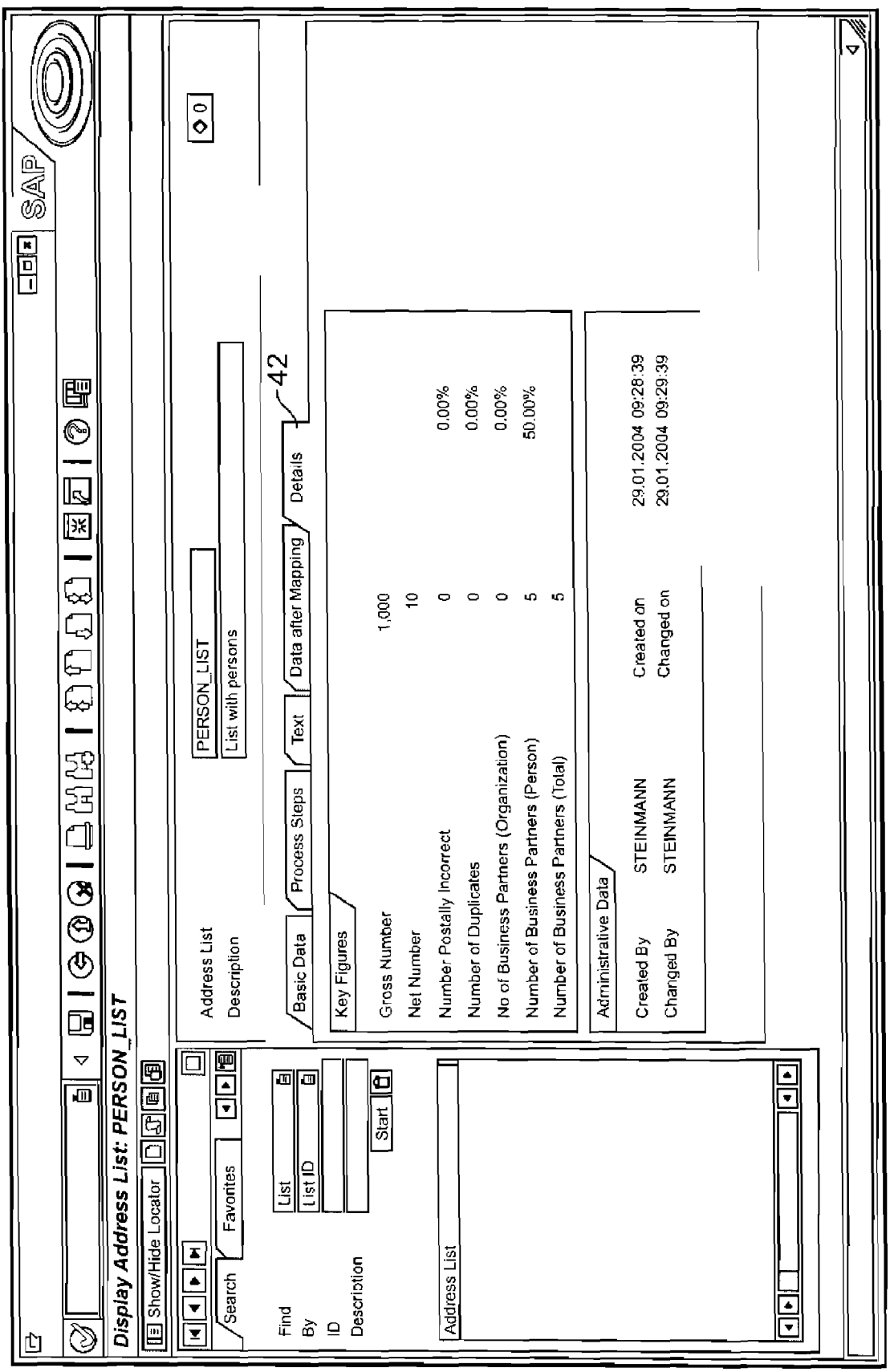

In FIG. 3H shows a screen with the tab strip 42. Here some key figures and administrative data are shown.

The processed data stored in the tables of the staging area can be use used in the user system for creating data objects for each data set. These data objects can then be further processed in the user system.

If a data object is created for a data set, a reference to the created data object is stored in the table CRMD_MKTLIST_I. The created data object is preferably stored centrally in the user system to be accessible for a plurality of applications. Table CRMD_MKTLIST_I establishes a link between the data sets stored in the staging area and the centrally stored data object.

In the following a graphical User Interface for mapping the read data sets stored in table CRMD_MKTLIST_C will be described with reference to FIGS. 4A to 4D. FIGS. 4A to 4D show screen-shots of a graphical user interface provided for the mapping function.

Before a data list can be mapped a mapping format must be defined.

Figure 4A:
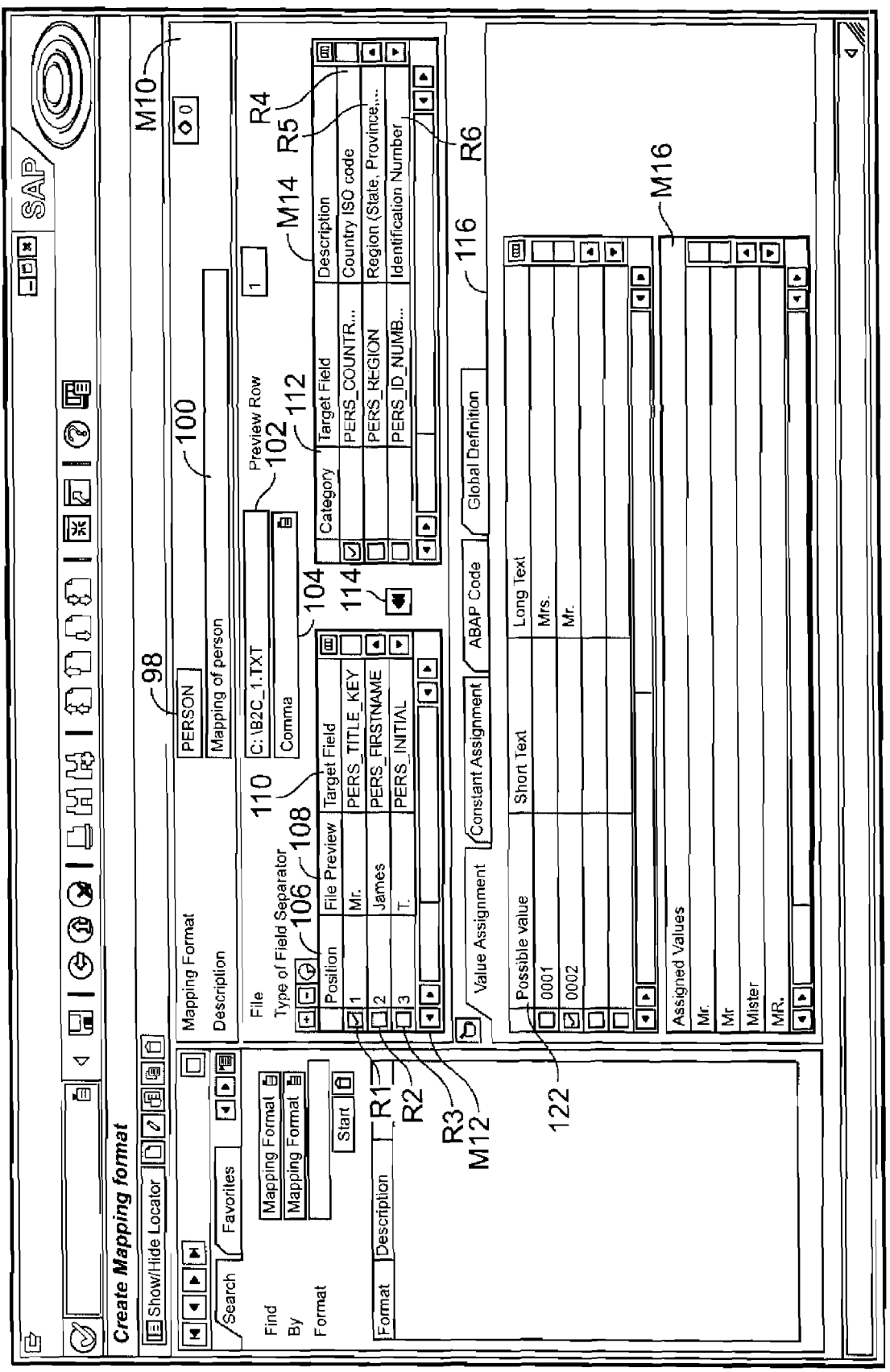
FIGS. 4A-4D show screen-shots of a graphical user interface provided for a mapping function.

FIG. 4A shows a screen in which the user can edit some or more mapping features.

In the general section M10 there is provided a field 98 for inputting an ID of a mapping format to be used. A specified (predetermined or predeterminable) mapping format previously stored can be used. Alternatively, a new mapping format can be created or an existing mapping format can be edited. Furthermore, in the field 100 a text description of the mapping format can be entered.

The file name of the imported file is entered in the field 102. Furthermore, the type of field separator is to be chosen in field 104.

Moreover, there are table controls M12 and M14 placed side to side. The table control M12 on the left (segment display section) has three fields 106, 108, 110 in which a position (column number of data segment in the imported file), a file preview (data segment of one data set in the file) and/or the target field name which indicates the target field to which the respective data segment is to be associated are displayed, respectively.

When creating a new mapping format this table control M12 is empty. When the data file for which the mapping format is to be used is selected, the file contents is read depending on the file separator selected. If a correct separator is selected the data is read and shown to the user in table control M12 with each row R1, R2, R3 in the table control M12 showing individual column values (data segments) of one data set of the data file in field 108. Since its only a preview, the first line of the data set is read and placed in the table control M12. If the user had chosen an invalid separator, the whole data set (first line) is shown in one single row (the first row R1 of the table control M12).

The table control M14 on the right (target display section) shows possible target fields defined in the staging area and their description. In the left table control M12 for every column (position) in the file a target field can be assigned in field 110.

A category column (field 112) appears in this control M14, which clearly demarcates the target fields which belong to an organization, organization address, person, person address and contact person function, in the case if address data are used. In case other types of data are used, other specifications can be given for the target fields. This table control displays only target fields.

Since now the user knows the file content for which the mapping has to be done, he can choose the target field by marking one of rows R4-R6 on the table control M14 and the source field by marking one of rows R1-R3 on the table control M12) and press the move button 114 which appears between these controls M12, M14.

Some target fields only allow specified (predetermined or predeterminable) values defined in a customizing table. For those target fields a value mapping can be defined as will be described hereinafter. For the value assignment the tab 116 is provided.

As shown in FIG. 4A, for the data segment "PERS_TITLE_KEY", i.e. the title of the person, in the user system the values 0001 and 0002 are provided (column 122), 0001 representing "Mrs." and 0002 representing "Mr.". In the data sets provided, e.g. the title of a person is indicated by the usual expressions Mrs. and Mr. Therefore, these usual expressions need to be substituted by the values used in the user system when importing the data sets into the user system.

Moreover, it is possible to assign a plurality of expressions used in the imported data sets to a specified (predetermined or predeterminable) value in the user system. A table control M16 is provided where the user can assign multiple values to the possible values of the mapped field. In the present example, the expressions "Mr.", "Mr", "Mister" and "MR" are all assigned to the value 0002 representing "Mr." in the user system.

Furthermore, there can be provided a field in which all possible values of a particular data segment of all data sets of a file for which value mapping is to be provided are displayed (not shown in FIG. 4A). Thus, the user can see all possible expressions used in the data file and assign these respectively to the values given in the user system.

Figure 4B:
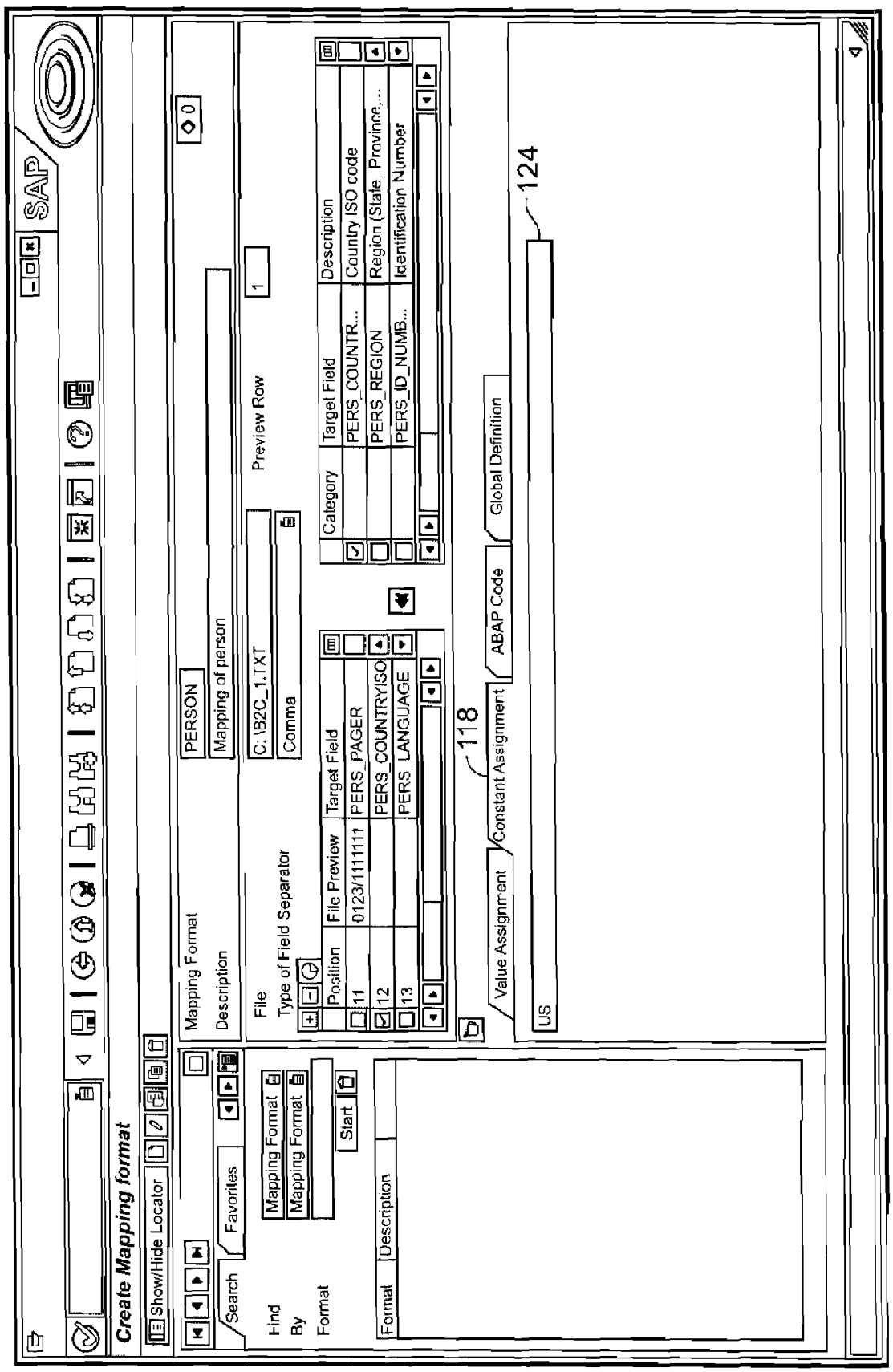

FIG. 4B shows a screen corresponding to the screen of FIG. 4A, wherein the tab 118 is visible.

For those target fields that should have the same value for all data sets in the file a constant assignment can be defined.

The constant assignment can be used if all data sets of the data list should have the same value for a particular field. For example a data list has data sets only from the United States but the country information is not part of the file. The country field is assigned to the mapping format and the constant value US is assigned to this field.

On tab strip 118 in field 124 the user can input the constant value to be assigned to all data sets.

Figure 4C:
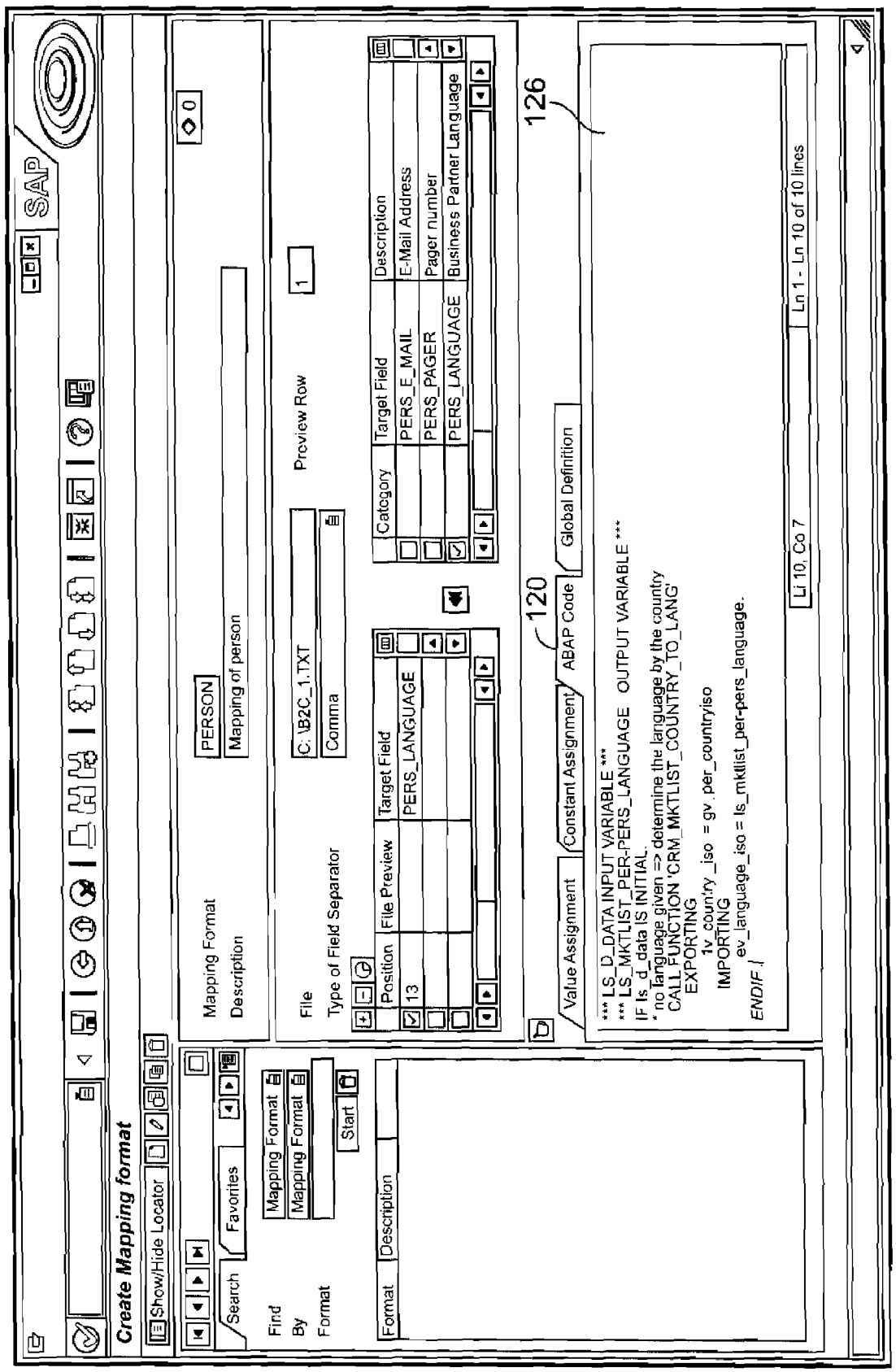

FIG. 4C shows a screen corresponding to the screen of FIG. 4A, wherein the tab 120 is visible.

For those target fields that need a more complex mapping algorithm, a code can be programmed in field 126. In the shown graphical user interface a so called "ABAP code" (Advanced Business Application Programming) can be defined.

The graphical user interface does not allow the user to select this tab 120 unless and until the user selects a mapped field from the table control M14, which holds the mapping fields. Now, the user can see the names of the input structure and the output structure (this is like input parameter and output parameter of a function module). The user can write executable routines in ABAP Code for this mapping field in this control. Care must be taken that the values that come in, are always in the input parameter and the output after the conversion should be assigned to the output parameter.

In the present example, the file contains no column with language information. Via coding the language information is derived from the country information.

Figure 4D:
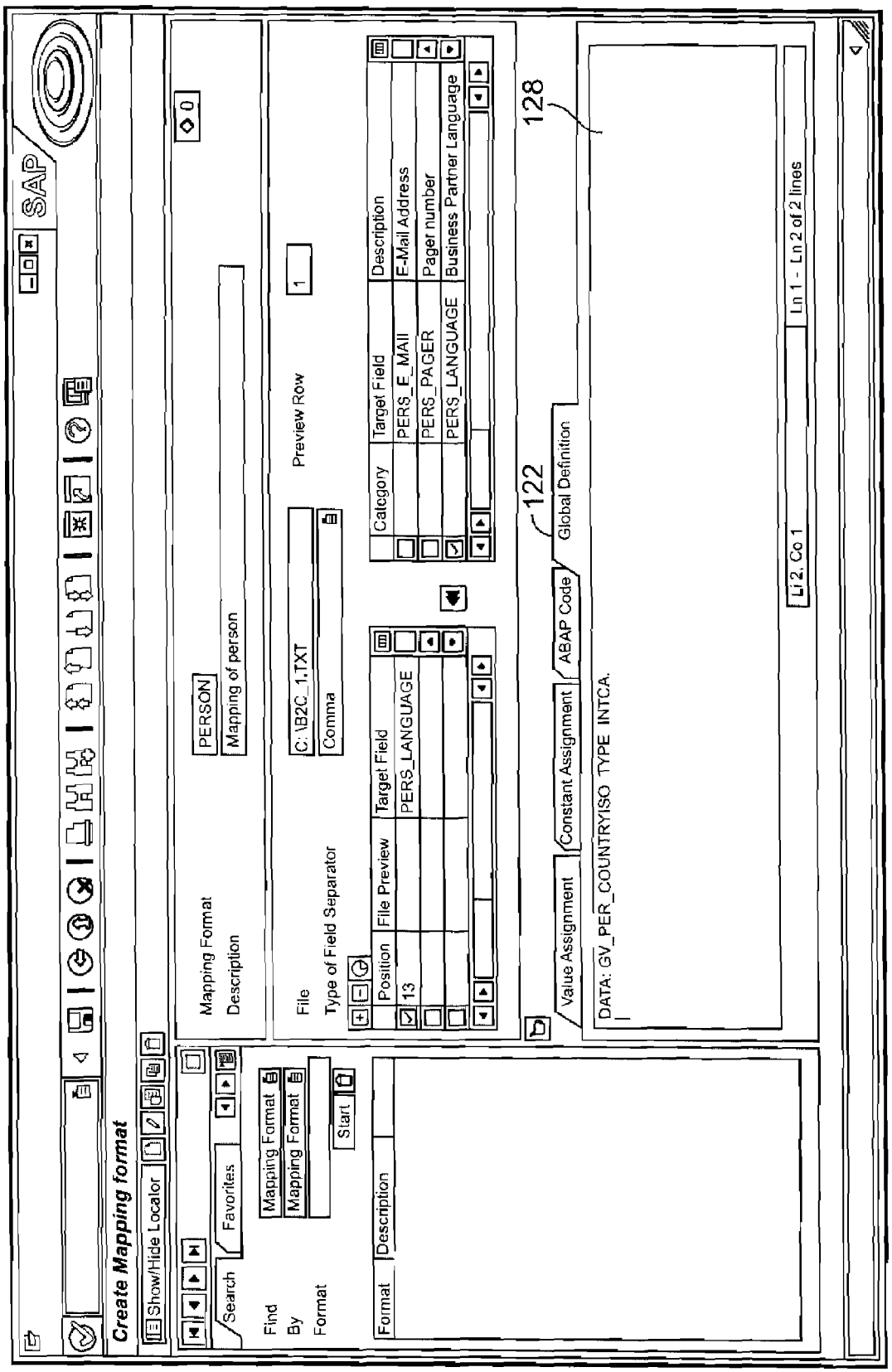

FIG. 4D shows a screen corresponding to the screen of FIG. 4A, wherein the tab strip 122 is visible.

If global variables are needed for the ABAP coding they can be defined in tab strip 122 in field 128.

The processing of the data is preferably done in a parallel manner. This means in particular that a main process calls at least two sub-processes which each process parts of the data. The processing is preferably done in parallel running asynchronous remote function calls (aRFC). The user can select whether the processing is to be done in a parallel manner or not. The parallel processing can be selected for each processing step, i.e. uploading, mapping, postal check, etc., separately.

By using locks, data sets can be processed by a plurality of sub-processes. Furthermore, it can be securely prevented that other processes access the data sets while they are being processed by the sub-processes.

Figure 5A:
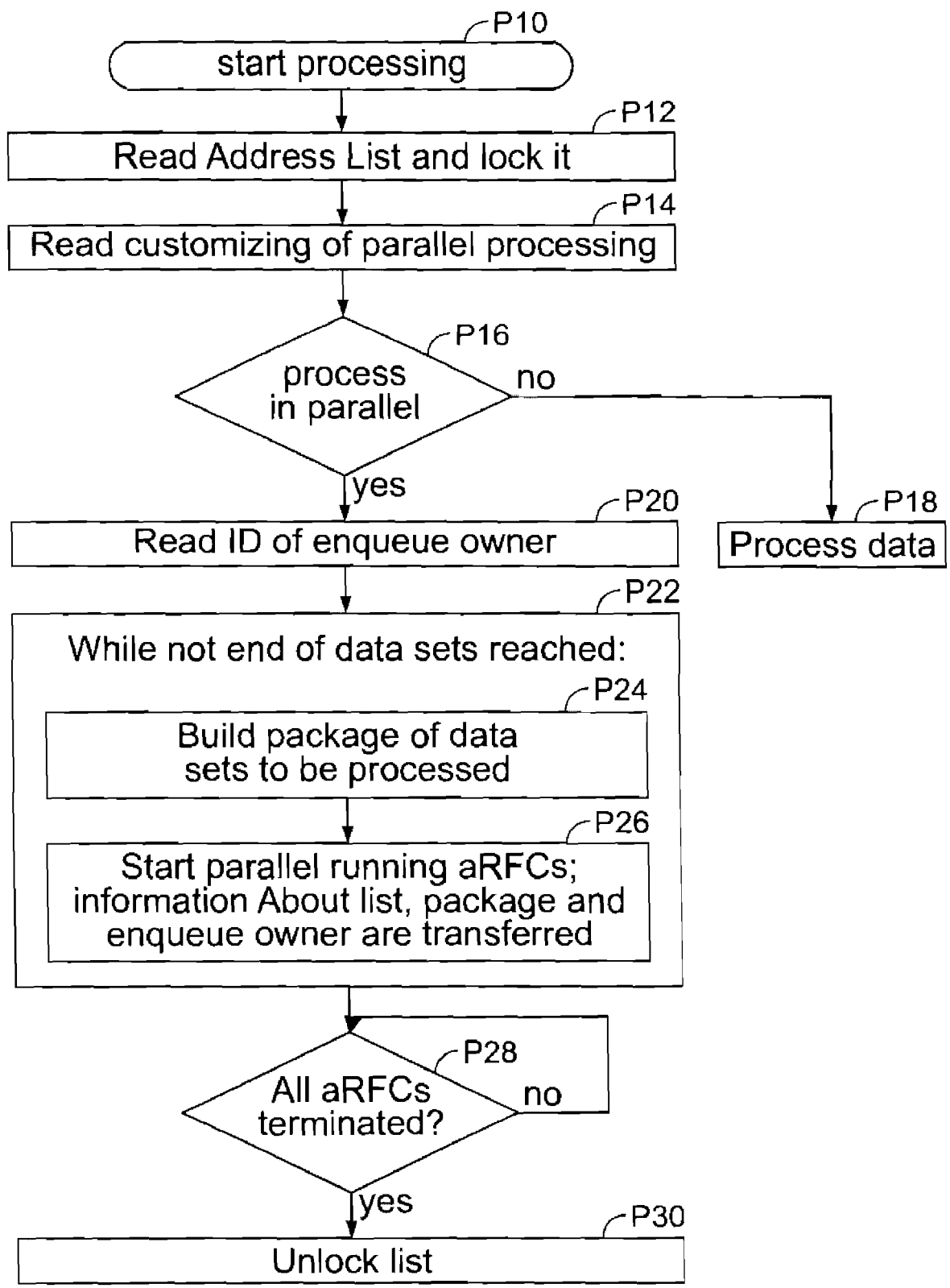
FIG. 5A shows a flowchart describing parallel processing in a main process.
Figure 5B:
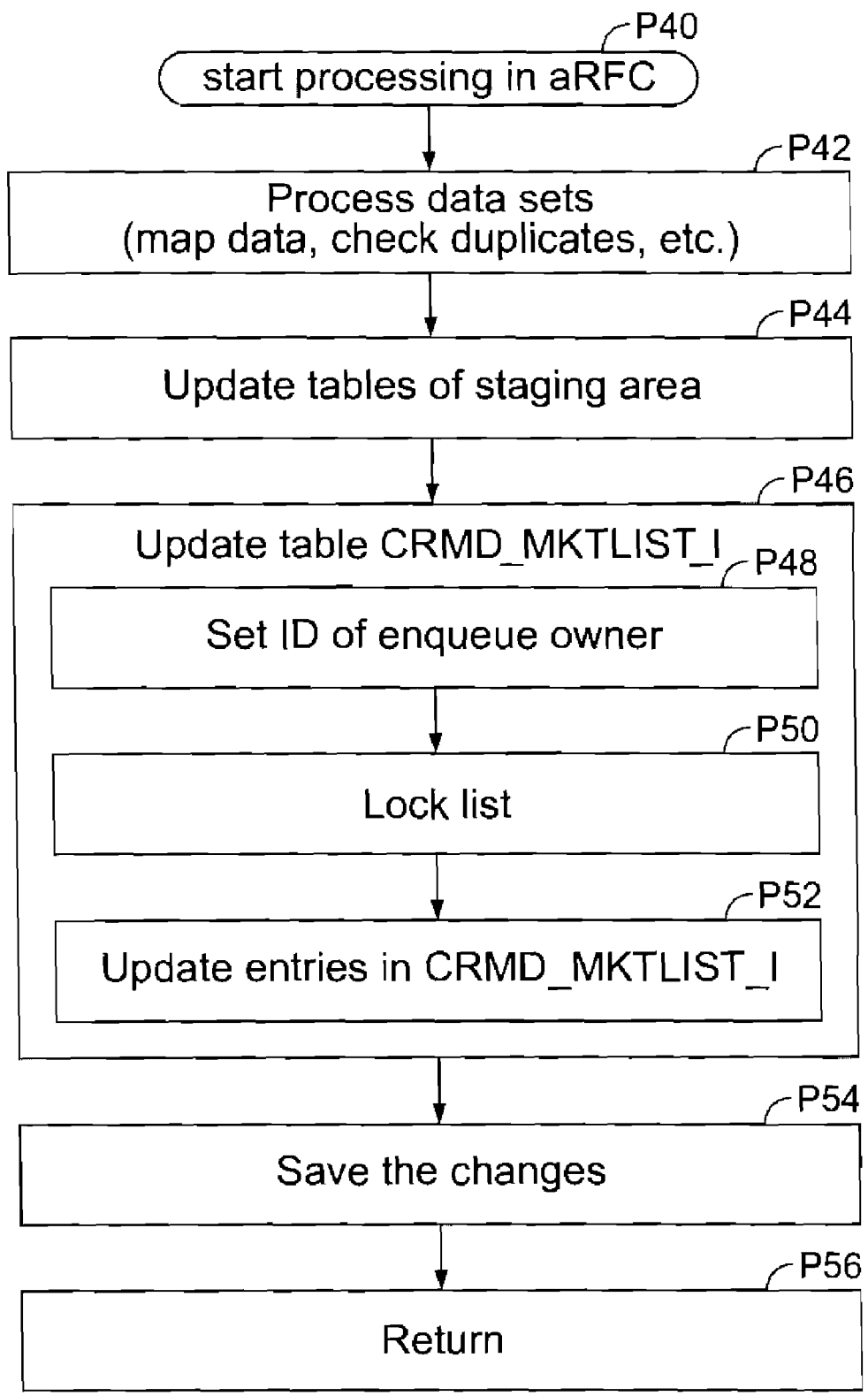
FIG. 5B shows a flowchart describing processing in a sub-process of FIG. 5B.

The method of parallel processing will be described with reference to FIGS. 5A and 5B. FIG. 5A shows a flowchart describing parallel processing in a main process and FIG. 5B shows a flowchart describing processing in a sub-process of FIG. 5A.

In step P10 a processing step, e.g. uploading, mapping, postal check, etc., is started. The data list to be processed is read and locked (step P12) by the main process. The locking prevents that the associated data list is accessed by another process at the same time. Locking the data to be processed in particular comprises providing the data with a specified (predetermined or predeterminable) marker which indicates that the respective data can only be accessed and/or processed by the owner of the lock, i.e. the process which possesses the ID of or associated to the lock. By transmitting different parts of the data and the lock to sub-processes, and thus processing the data substantially in parallel, the processing speed can be enhanced as the system resources can be used in a better way.

Then, the customizing of the parallel processing is read (step P14). The user can e.g. customize if parallel processing should be used and how many parallel running processes should be started. In step P16 it is determined whether a parallel processing is to be done or not. If data is not to be processed in parallel ("no" in step P16), the data is processed by the main process (step P18). If data is to be processed in parallel ("yes" in step P16), the main process reads the ID of the enqueue owner (step P20). The ID of the enqueue owner corresponds to the ID of the lock with which the list has been locked. If any tables are to be updated or changed, the lock ID is needed.

In step P22 a loop is carried out as long as the end of the data sets is not reached. In this loop, in step P24 packages of data sets of the data list to be processed are built. In step P26 the parallel running sub-processes (aRFCs) are started. Information about the list to be processed, the package of data sets to be processed by the respective sub-process, and the enqueue owner (information about the lock) are transmitted to the sub-process.

In step P28, it is determined whether all aRFCs have terminated the processing. If not all aRFCs have yet terminated the processing ("no" in step P28), the determination is repeated. If all aRFCs have terminated the processing ("yes" in step P28), the list is unlocked by the main process.

Now processing of data in a sub-process will be described with reference to FIG. 5B.

In step P40 the processing in an aRFC is started and data sets are processed in step P42.

After the data sets have been processed, the tables of the staging area are updated (step P44), i.e. the processed data is written into the tables.

In step P46 the table CRMD_MKTLIST_I is updated, i.e. during processing the step "Postal Check" the filed POSTAL is filled. During the update, the ID of the enqueue owner is set in step P48. This ensures that in step P50 the list can be locked with the same lock ID it was originally locked in the main process. Only if the list can be locked the entries of CRMD_MKTLIST_I are updated in step P52.

AI locks are stored in a global table. This table is located in the main memory of a server of the system. All processes of the system have access to that global table by a service offered by the kernel of the system. This service, preferably an application program interface (API) called by the processes, offers a kind of write access. The access to the global table is a follows: A process wants to lock an object and calls this service. If the lock request is successful, the requester gets a positive return code (i.e. value=0) and the service locks the object by making an entry in the global table. If the lock request is not successful, the requester gets a negative response (i.e. value $^1$0). In this case, there already exists an entry in the global lock table for this object.

Subsequently the changes are saved in step P54 and the aRFC is terminated and returns to the main process (step P56).

As described above, every aRFC process the data sets of the given package and brings the data into the staging area.

Data sets imported into the system can have a specified (predetermined or predeterminable) property. Such a property can be associated with a further constriction, e.g. that the data sets can only be used a specified number of times. In the present case, the data can e.g. be rented from a data provider. Such rented data in general only have a limited number of uses and/or a limited time frame in which they can be used by the user. Therefore, the data have to be marked accordingly with a flag. In the present case, a so called "rented flag" is used. If a specified (predetermined or predeterminable) event occurs, the specified property of the data can be changed, i.e. the flag deleted.

In order to be able to check if accordingly marked data sets have already been used the maximum number of times, and can thus not be used again, or if the data set can still be used, a counter is associated with each data set. The counter indicates how many times the respective data set has already been used.

The checks to determine whether a data set can be used a further time have to be performed before the respective data set is used. However, such checks need only to be done if the data sets still has a specified property, i.e. is marked a rented in the present case.

Figure 6:
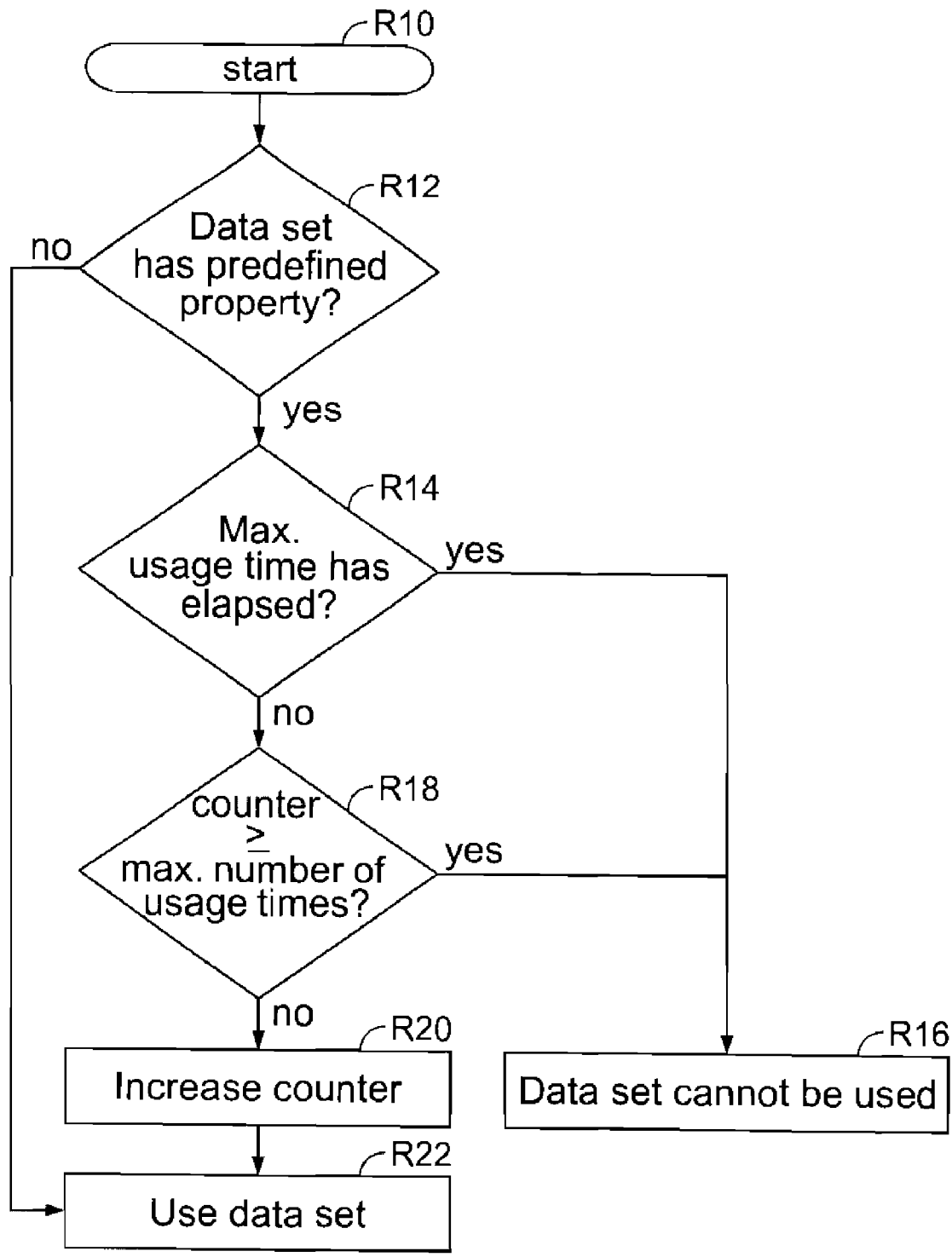
FIG. 6 shows a flowchart describing checks performed in data sets before they are used.

In the following it will be described with reference to FIG. 6 how such checks are done.

In step R10 the processing of a specified data set starts. In step R12 it is checked whether the respective data set has a specified property. In case the data set does not have the specified property ("no" in step R12), the data set can be used without any further checks and the process proceeds to step R22. In case the data set has the specified property ("yes" in step R12), a check is made whether the maximum usage time for the data set has elapsed (step R14). If the maximum usage time for the data set has elapsed ("yes" in step R14), the data set cannot be used and the process proceeds to step R16. If the maximum usage time for the data set has not yet elapsed ("no" in step R14), a check is made whether the number of the counter associated with the data set is equal or larger than the maximum number of usage times of the data set (step R18). If the counter is equal or larger than the maximum number of usage times ("yes" in step R18), the data set cannot be used and the process proceeds to step R16. If the counter is less than the maximum number of usage times ("no" in step R18), i.e. the data set can still be used, the counter is increased (step R20) and the data set is used (step R22).

If the action to be done with the data set cannot be executed properly, the data set can be used again, i.e. the counter must be decreased.

In case a specified (predetermined or predeterminable) reaction can be tracked in response to an action executed with a data set, the specified property can be removed from the respective data set. In such a case, the data set can be used freely substantially without the necessity of any of the above checks to be done.

The data set can be used in different sections of the user system. In particular, the user system can comprise a first section for importing and processing the data sets and at least one second section in which the data sets are used for interaction with still other parts of the system. If the data sets have the above defined specified property, there are restrictions given with respect to their use, as already partly discussed above. In order to maintain a consistency of the data, the counter is preferably stored in the first section and all sections using respective data sets inquire with the first section whether a data set can be used or not if the data set has the specified property.

In case the maximum usage time of a data list has run up and some or all of the data sets of this list still have the specified property, in many cases the data sets need to be removed from the system. However, as discussed above, it is possible that the data sets are also used in other sections of the system. As a consequence, the data not only has to be deleted in the first section into which the data has been imported but also in the other sections where the data sets are used.

Figure 7:
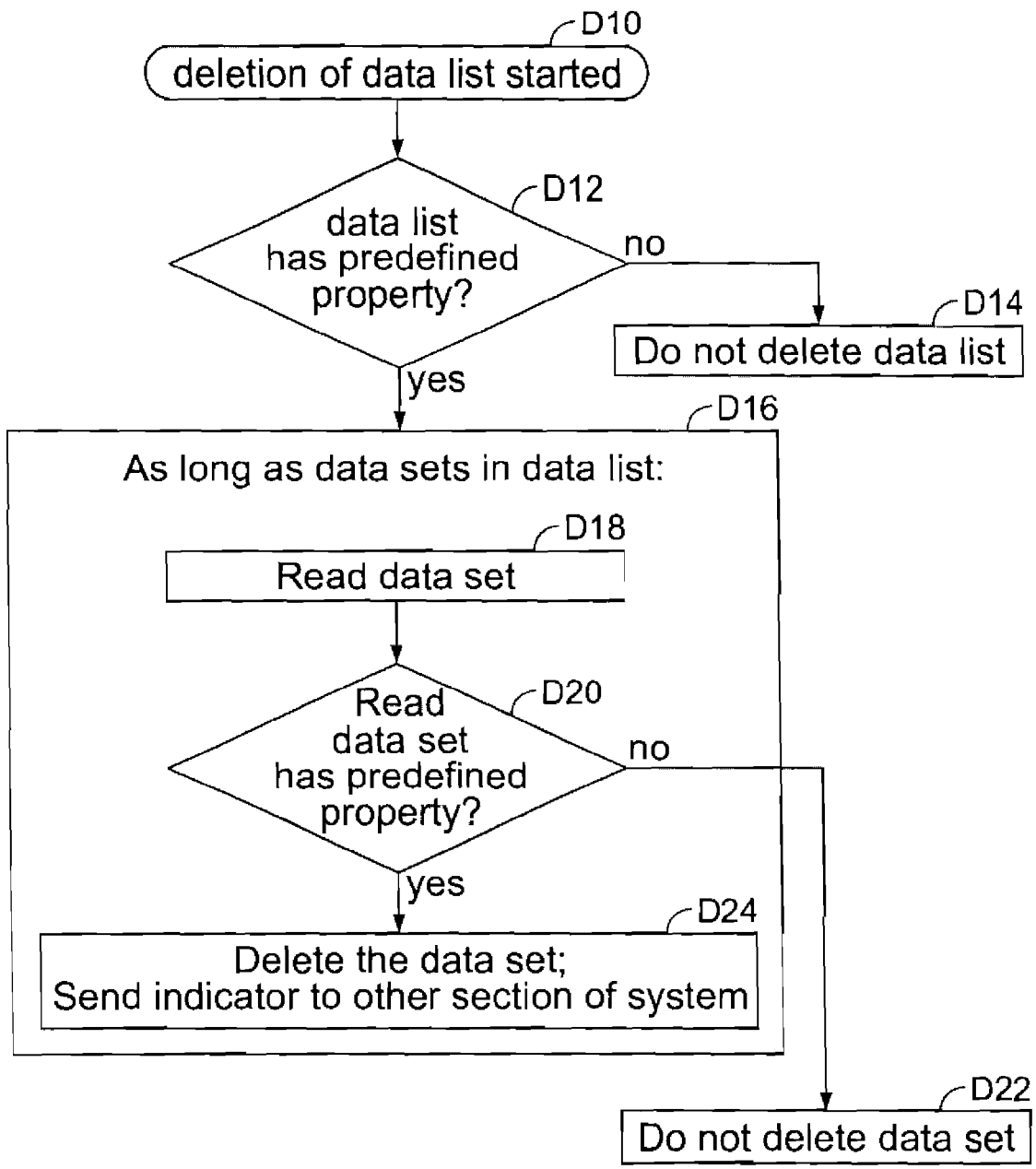
FIG. 7 shows a flowchart describing the deletion of data sets.

In the following, the basic process of deleting data sets having a specified property in the first section of the user system will be described with reference to FIG. 7. For the following description it is assumed that only data sets are used and no data objects have been created.

The deletion of a data list is started in step D10. This process is in particular started if the maximum usage time of a data list has expired.

In step D12 it is checked whether the data list has the specified property. In the present case this is a check whether the data list is rented or not. If the data list does not have the specified property ("no" in step D12), the data list does not have to be deleted (step D14). If the data list has the specified property ("yes" in step D12), step D16 is performed as long as the end of the list in not reached, i.e. as long as there are data sets in the data list.

In step D16 the following steps are performed preferably for each data set of the data list. The data set is read from the data list (step D18). It is checked, whether the read data set has the specified property (step D20). If the data set does not have the specified property ("no" in step D20), the data set does not have to be deleted (step D22). If data set has the specified property ("yes" in step D20), the data set is deleted in step D24. Furthermore, in this step an indicator is sent to preferably all other sections of the system in which the data set is used. In the present case, the data sets are also used in the second section. Therefore an indicator is sent to the second section.

In the second section the indicator from the first section is received and the respective data set is anonymized, in particular the contents of the data set is filled with blank fields.

After having finished the processing described above, all data sets which had a specified property are removed from the system.

Figure 8:
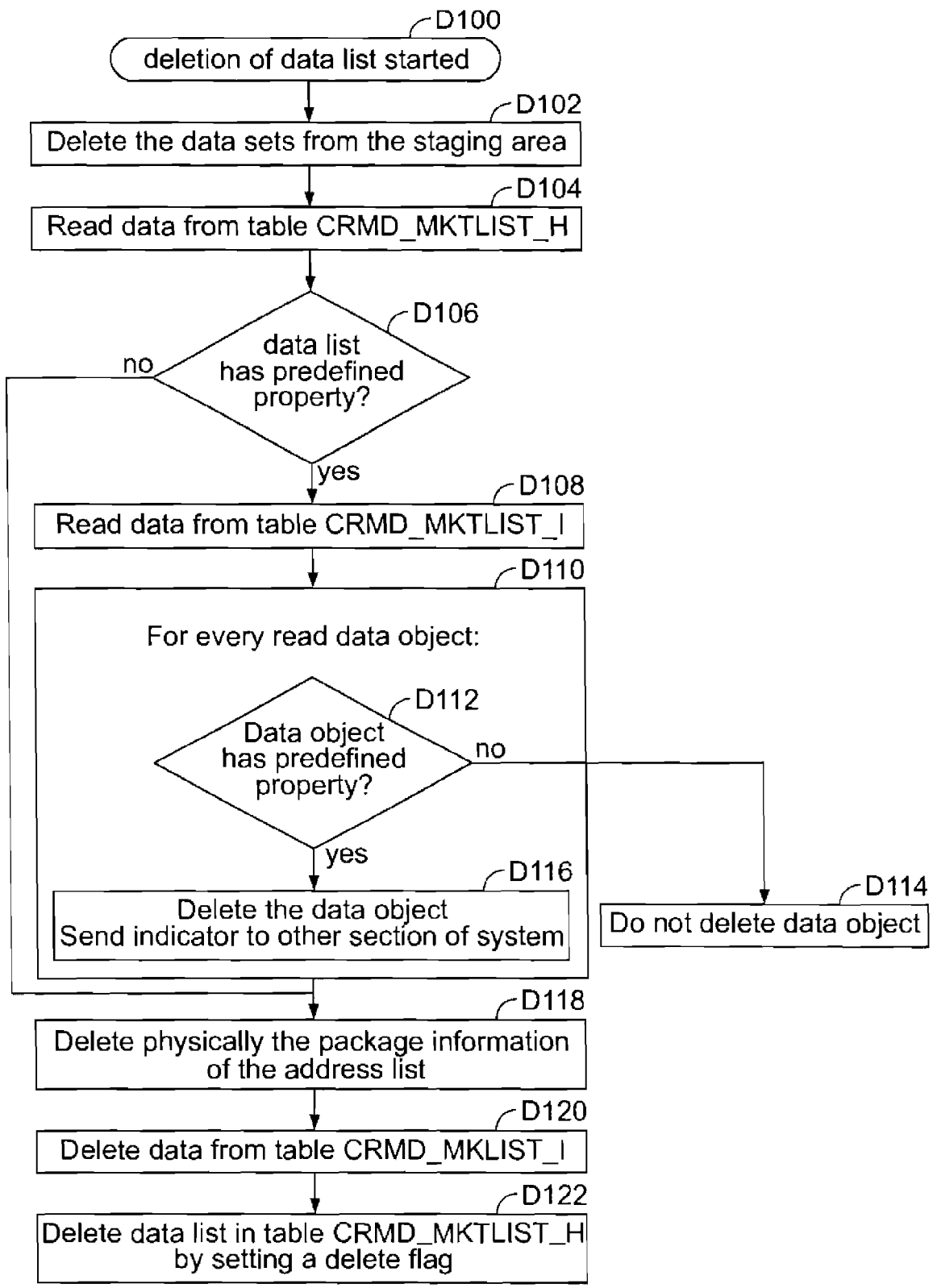
FIG. 8 shows a flowchart describing another alternative of the deletion of data sets.

In the following, there will be given a description of a deletion process for the case in which data objects have been created from the data sets. In this case, all data from the staging area needs to be deleted. Furthermore, the created data objects having a specified property need to be deleted. A flow chart for such a deletion process is shown in FIG. 8.

In step D100 the deletion of the data list is started and in step D102 all data sets are deleted from the staging area, i.e. the tables CRMD_MKTLIST_E, CRMD_MKTLIST_C, CRMD_MKTLIST_ORG, CRMD_MKTLIST_PER, CRMD_MKTLIST_ADR, CRMD_MKTLIST_CEN.

The data stored in CRMD_MKTLIST_H is read (step D104), i.e. the ID of the list to be deleted is read. In step D106 it is checked whether the data list has the specified property. In case the data list does not have the specified property ("no" in step D106), the process proceeds to step D118. In case the data list has the specified property ("yes" in step D106), the reference to the data objects is read from table CRMD_MKTLIST_I (step D108).

For every data object associated with the list to be deleted (step D110), it is determined whether the data object has the specified property (step D112). In case the data object does not have the specified property ("no" in step D112), the process proceeds to step D114 and the data object is not deleted. In case the data list has the specified property ("yes" in step D112), the data object is deleted. Furthermore, in this step an indicator is sent to preferably all other sections of the system in which the data set is used. In the present case, the data sets are also used in the second section. Therefore an indicator is sent to the second section. In the second section a similar processing to the one described with reference to FIG. 7 is done.

In step D118 the data in the tables CRMD_MKTLIST_S, CRMD_MKTLIST_L, CRMD_MKTLIST_PH are deleted. Then, the data in the table CRMD_MKTLIST_I is deleted (step D120). In the table CRMD_MKTLIST_H the delete flag is set (step D122).

After the deletion only the table CRMD_MKTLIST_H and CRMD_MKTLIST_T contain information about the deleted list.

The above described system can furthermore be used for an enhanced reporting on the quality and success of the provided data.

After having uploaded and mapped the data provided, the user can create business partners which are e.g. contacts to be used for acquiring new customers. The created business partners can then be assigned to created target group. Target groups are used during marketing campaigns. A target group can e.g. be persons who have a particular income level, age, etc.

A campaign is defined and the created target group is assigned. During the execution of the campaign for all business partners in the target group Marketing outbound contacts (emails, phone calls, . . . ) are generated. The campaign information can be transferred to an accounting system for the closed loop analysis (sales revenue of a campaign <-> costs of a campaign).

If a contacted business partner shows a positive reaction, the Inbound information is tracked via an activity. When the activity is saved, an additional action can be executed to remove the rented flag if the business partner is rented.

If the contacted business partner orders a product, the sales order is created in the system (e.g. within Call Center by a call agent). The ID of the campaign is assigned to this sales order. The sales order can transferred an accounting system for the fulfillment. In the accounting system the sales order is delivered, the invoice is created, the sales revenue and the costs are collected. It is important that the sales orders are connected with the campaign.

With the provided information, the sales success can be evaluated and the costs and revenues of the address list can be compared.

The reporting function can e.g. comprise the following aspects:

How many of the acquired addresses have been acquired as new customers? How are these distributed over a defined period?

On average, how many business activities were necessary to acquire the addresses as new customers?

How many of the addresses contacted were incorrect (for example, wrong telephone number, wrong email address)? Links must also be provided here to the CIS and Mail Tool reporting data.

Which means of communication (email, fax, telephone, and so on) produced the most new customers (won customers per communication medium)?

How many duplicates were there in the acquired data?

How many new customers placed a purchase order?

What is the average order size of these new customers within a defined period?

What is the average sales revenue obtained from these new customers within a defined period? Compare these values with the cost of the acquired addresses.

How many of the addresses have been acquired as new customers compared with other (previously) acquired addresses (from the same provider/from other providers)?

In which region the most customers are won (comparison existing customers/won customers per region)?

As discussed above, the sales success of an address list can be evaluated. The following can e.g. be evaluated:

Number of addresses that were created in the system and the number of contacts for these addresses Number of addresses that are won as customers and which have therefore created revenue Total sales and contribution margin Total revenue, as well as average revenue per won customer Furthermore, the quality of an address list can be evaluated, e.g. the number of incorrect addresses and the number of duplicated addresses in an address list can be output.

The above description has been given for the importing and processing of address data set into a user system. However, other types of data can also be processes by the described structures. Such data could e.g. be measurement data which are to be evaluated in an evaluation system.

The invention can be implemented with digital electronic circuitry, or with computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

| List of Reference Numerals | |
| --- | --- |
| 10 | user system |
| 12 | first section |
| 14 | second section |
| 30 | field |
| 32 | field |
| 34-42 | tab strip |
| 44-60 | field |
| 62, 64 | region |
| 66-76 | field |
| 78 | save button |
| 80, 82 | field |
| 84-92 | traffic light |
| 94 | flag |
| 96 | log button |
| 98-112 | field |
| 114 | move button |
| 116-122 | tab strip |
| 124-128 | field |
| M10-M16 | table control |
| R1-R6 | row |

A number of embodiments of the invention have been described. Nevertheless, it will be understood that various modifications may be made without departing from the spirit and scope of the invention. Accordingly, other embodiments are within the scope of the following claims.

What is claimed is:

1. A computer program product tangibly embodied in a computer-readable medium and comprising executable program instructions that when executed by a processor provide a graphical user interface on an interconnected display device for creating a mapping from a file to a data list, the graphical user interface comprising:

a file name input field for inputting a filename of the file in which data sets are stored;

a separator input field associated with the file name input field for inputting a separator to be used in identifying individual data segments of the data sets in the file;

a segment display section in which data segments of one of the data sets in the file are displayed such that any of the data segments is selectable, the data segments read from the file using the separator, the segment display section comprising a preview section presenting values of the data segments and a target field section indicating a target field for the respective data segment;

a target display section presented adjacent the segment display section and in which possible target fields to which data segments can be associated/mapped are displayed such that any of the target fields is selectable; and a selection device for associating a data segment selected by a user in the segment display section with a target field selected by the user in the target display section, wherein the mapping is defined from the selected data segment to the selected target field;

wherein the data list is configured to have a constant value associated with a particular data segment of substantially all data sets, wherein the file does not include the constant value for the substantially all data sets, and wherein the graphical user interface furthermore comprises a constant association display section in which the constant value can be selected.

2. The computer program product according to claim 1, wherein the graphical user interface furthermore comprises a value mapping section for replacing a value in the file with a predetermined value used in a system that is to receive the data list.

3. The computer program product according claim 2, wherein the data list is configured to have a constant value associated with a particular data segment of substantially all data sets, wherein the file does not include the constant value for the substantially all data sets, and wherein the graphical user interface furthermore comprises a constant association display section in which the constant value can be selected.

4. The computer program product according to claim 1, wherein the graphical user interface furthermore comprises a code input section in which program code can be input for processing the contents of one of the data segments to be associated with one of the target fields, the program code using a name of the data segment from the segment display section and a name of the target field from the target display section.

5. The computer program product according to claim 2, wherein the graphical user interface furthermore comprises a code input section in which program code can be input for processing the contents of one of the data segments to be associated with one of the target fields, the program code using a name of the data segment from the segment display section and a name of the target field from the target display section.

6. The computer program product according to claim 3, wherein the graphical user interface furthermore comprises a code input section in which program code can be input for processing the contents of one of the data segments to be associated with one of the target fields, the program code using a name of the data segment from the segment display section and a name of the target field from the target display section.

7. The computer program product according to claim 1, wherein the graphical user interface furthermore comprises a code input section in which program code can be input for processing the contents of one of the data segments to be associated with one of the target fields, the program code using a name of the data segment from the segment display section and a name of the target field from the target display section.

8. The computer program product according to claim 7, wherein the program code requires global variables, the graphical user interface furthermore comprising a global definition input section for inputting the global variables to be used during execution of said input program code.

9. A method for displaying a graphical user interface for creating a mapping from data sets in a file to a data list, each data set in the file comprising data segments separated by a separator, the data list comprising target data fields, said method comprising the steps of:
  displaying a file name input field for inputting a filename of the file;
  displaying a separator input field associated with the file name input field for inputting the separator to be used in identifying individual data segments of the data sets in the file;
  displaying a segment display section in which data segments of one of the data sets in the file are displayed such that any of the data segments is selectable, the data segments read from the file using the separator, the segment display section comprising a preview section presenting values of the data segments and a target field section indicating a target field for the respective data segment;
  displaying a target display section adjacent the segment display section in which possible target fields to which data segments can be associated/mapped are displayed such that any of the target fields is selectable; and
  displaying a selection device for associating a data segment selected by a user in the segment display section with a target field selected by the user in the target display section, wherein the mapping is defined from the selected data segment to the selected target field;
  wherein the data list is configured to have a constant value associated with a particular data segment of substantially all data sets, wherein the file does not include the constant value for the substantially all data sets, and wherein the graphical user interface furthermore comprises a constant association display section in which the constant value can be selected.

10. The method according to claim 9, wherein the graphical user interface furthermore comprises a value mapping section for replacing a value in the file with a predetermined value used in a system that is to receive the data list.

11. The method according to claim 9, wherein the graphical user interface furthermore comprises a code input section in which program code can be input for processing the contents of one of the data segments to be associated with one of the target fields, the program code using a name of the data segment from the segment display section and a name of the target field from the target display section.

* * * * *